United States Patent Office 2,913,433
Patented Nov. 17, 1959

2,913,433

POLYAMIDES FROM HYDROCARBON SUBSTITUTED PIPERAZINES AND CARBOCYCLIC DICARBOXYLIC ACID

Emerson L. Wittbecker, West Chester, Pa., assignor to E. I. du Pont de Nemours and Company, Wilmington, Del., a corporation of Delaware No Drawing. Application December 28, 1955
Serial No. 555,761

20 Claims. (Cl. 260—47)

This invention relates to condensation polymers and more particularly to new soluble high-melting synthetic linear polymers characterized by the presence of recurring structural units containing amide linkages formed from piperazines and carbocyclic dicarboxylic acid.

This application is a continuation-in-part of application Serial No. 359,975, filed June 5, 1953, 383,410, filed September 30, 1953 and 412,949, filed February 2, 1954.

Synthetic linear polyamides are generally prepared by condensation of substantially equimolecular amounts of a diamine and a dicarboxylic acid, or its amide-forming derivatives or by the self-condensation of relatively long-chain amino acids or their amide-forming derivatives. Two well-known examples of these polyamides are polyhexamethylene adipamide and polyepsilon caproamide. These particular polyamides, which are well-known in commerce, melt respectively at 265° and 215° C. Although these melting points are not generally considered to be an adverse factor for ordinary usage in the form of textile fibers, they do require care in employing the proper safe ironing temperature. Obviously, higher melting points are desirable where high temperature-resistant properties are required, e.g., wire coating, tire cord, heat-stable filters, etc. Generally, these prior art polymers are appreciably soluble only in strong solvents such as phenol, m-cresol, formic acid, concentrated sulfuric acid and the like, which are strongly corrosive, toxic and difficult to work with.

Polyamides melting above 300° C. have been difficult to make, in part because of the poor solubility characteristics, but principally because the usual methods of melt polymerization had to be carried out at temperatures above the decomposition temperature of the polymer-making ingredients, the polymer itself, or both. The resulting polymeric products, when such products were obtained, were of poor quality and were not suitable for commercial exploitation. Because of generally poor solubility, these high melting polymers could not be satisfactorily prepared in solution or through the use of melting point depressants in the manner disclosed in U.S. Patent No. 2,214,442 to Spanagel. Although solid state polymerization is known (Flory, U.S. Patent 2,172,374), this method is difficult to adapt to commercial scale operations. Furthermore, the few high melting polymers known to the prior art have had little utility, since they can neither be melt-spun nor solution-spun readily into useful fibers.

It is an object of this invention to provide a class of polyamides and copolymers thereof which are both high melting and soluble. Another object is to provide a class of high melting polyamides and copolymers which form useful fibers and films. A further object of this invention is to provide a class of polyamides and copolymers thereof which are both high melting and soluble and which are readily adapted to solution spinning techniques. Another object is to provide solutions of this new class of polyamides and copolymers. Other objects will become apparent from the specification and claims.

These objectives are accomplished by the discovery of a new class of synthetic linear condensation polymers, having unexpected and desirable solubility and melting characteristics, characterized by the presence of recurring structural units containing amide linkages formed from at least one of the piperazines of the class defined below and at least one dibasic carbocyclic acid of the class consisting of dicarboxylic acids in which each carboxyl group is attached to a carbocyclic ring and the carboxyl groups are separated by at least three atoms, and the amide-forming derivatives of these acids. Examples of these acids are terephthalic acid, cis-hexahydroterephthalic acid, trans-hexahydroterephthalic acid, isophthalic acid, cis-hexahydroisophthalic acid, trans-hexahydroisophthalic acid, bibenzoic acids, cis-hexahydrobibenzoic acids, trans-hexahydrobibenzoic acids, cis, cis-dodecahydrobibenzoic acids, cis, trans-dodecahydrobibenzoic acids, trans, trans-dodecahydrobibenzoic acids, cis-1,3-cyclopentane dicarboxylic acid, trans-1,3-cyclopentane dicarboxylic acid, cis-1,3-cyclobutane dicarboxylic acid, trans-1,3-cyclobutane dicarboxylic acid, naphthalene dicarboxylic acids and

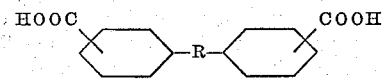

where R may be —O—, —CH$_2$—, —CH$_2$CH$_2$—, —C(CH$_3$)$_2$—, —SO$_2$—, —OCH$_2$CH$_2$O—, —Si(CH$_3$)$_2$—,

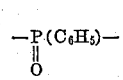

and

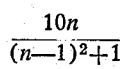

Amide-forming derivatives of these acids include the anhydrides, amides, acid halides, monoesters, and diesters which are known to form amides when reacted with a primary or secondary amine.

The piperazines, which compose the amide linking units of which the polymers of this invention are comprised, are piperazine and substituted piperazines in which each substituent is a hydrocarbon radical, preferably free from aliphatic unsaturation, located on carbon of the piperazine nucleus and containing up to $$\frac{10n}{(n-1)^2+1}$$

carbons, where $n$ is the total number of such substituents and any aromatic ring attached directly to a singly substituted carbon of the piperazine nucleus is counted as 3 carbons. In applying this formula only whole numbers of carbons are counted, e.g., when there are 8 substituents, each one contains 1 carbon and not 1.6 carbons. These piperazines are represented by the structural formula

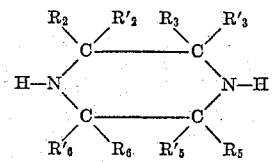

wherein the R and R' symbols represent hydrogen and hydrocarbon substituents at the 2, 3, 5 and 6 positions on carbon of the piperazine nucleus, and the maximum number of carbon atoms in each separate substituent is given by the formula $$\frac{10n}{(n-1)^2+1}$$

wherein $n$ is a number from 0 to 8 equal to the total number of such substituents and any aromatic ring attached directly to a singly substituted carbon of the piperazine nucleus is counted as 3 carbons. It is preferred that such substituents be methyl or ethyl and be arranged symmetrically on the piperazine nucleus. When such substitution gives cis- or trans- isomers it is indicated that the transisomer is to be preferred since this form is usually the more common, the more reactive and productive of polymers which are somewhat higher melting.

In contra-distinction to any previously known polymers, the synthetic linear condensation polymers of this invention not only remain solid at temperatures up to at least 300° C. but also form solutions suitable for spinning. Useful solvents include tetrafluoropropanol, chloroform-methanol azeotrope (88/12 parts by weight), methylene chloride-methanol azeotrope (92/8), chloroform-formic acid azeotrope (85/15), 1,1,2-trichloroethane-formic acid azeotrope (60/40) pentachloroethane-phenol azeotrope (90.5/9.5) and ethylene chlorohydrin. An even more surprising property of the piperazine polyamides of this invention is that copolymers formed in combination with other condensation polymer structural units even in appreciable quantity, likewise possess both melting temperatures above 300° C. (or are infusible) and appreciable solubility in the above class of solvents.

In many cases a solvent mixture having a composition weight ratio other than that of the given azeotrope may be just as good a solvent for a particular polymer or copolymer, even though the azeotrope is generally to be preferred. Other solvents which are useful for certain of the polymers and copolymers include 1,1,2-trichloroethane, acetic acid, dimethylformamide, chloroform, lactonitrile, trichloroethane-acetic acid (70/30), ethanol-nitromethane (73/27) and 80% ethanol.

The copolymers comprise the copolyamides of piperazines formed from one or more of the dibasic carbocyclic acids, as well as the copolymers formed from piperazines, at least one of the dibasic carbocyclic acids, and additional condensation polymer-forming ingredients. The preferred linear condensation polymers of this latter type which fall within the scope of this invention are defined as those where different types of structural units in the condensates are comprised to the extent of at least 50 mol percent of piperazines and the specified class of carbocyclic dicarboxylic acids or their amide-forming derivatives to make up the major fraction, and where remaining types of structural units in the condensates are comprised to a lesser extent of synthetic linear polymer-forming reactants capable of forming recurring structural linkages taken from the class comprising amides, sulfonamides, urethanes, esters, and ureas to make up the minor fraction. Additionally it is preferred that each of the constituent reactants of the minor fraction comprise a smaller mol percent of the total than the mol percent of the total represented by the lesser of the preponderant piperazine reactant or the preponderant carbocyclic dicarboxylic acid reactant.

It is preferred that these copolymers melt appreciably above 300° C. or be infusible, so it is preferred that the number of different types of structural units making up any single copolymer be not more than six. An increase in the different types of structural units beyond six generally does not result in an improvement of the favorable properties of the copolymer but does generally result in less favorable properties such as lower melting point, higher water sensitivity, lower crystallinity and higher cost.

Although the compositions of the preferred copolymers will vary somewhat, depending on the copolymer-forming ingredients employed, it is preferred that the compositions generally fall within certain well-defined limits.

Where the copolymers are the copolyamides of one or more of the piperazines and one or more of the dibasic carbocyclic acids, it is preferred that the number of different types of recurring structural units does not exceed six and that when 5 or 6 are present, at least one of the different types of structural units be present to an extent of at least 50 mol percent. When no one of these structural units is present to an extent of at least 50 mol percent, then it is preferred that the number of such structural units does not exceed four. Except as already described, these structural units may be present in any proportion.

In determining the number of different types of structural units in a polymer of this invention, the cis and trans forms of a given acid are to be considered as different acids, because cis and trans isomerism in the acids is a determinant of the configuration of the polymer chain.

Where the copolymers are formed from one or more of the piperazines, one or more dibasic acids of the specified class of carbocyclic dicarboxylic acids and their amide-forming derivatives, and one or more of copolymer-forming ingredients taken from the class consisting of dicarboxylic acids and their amide-forming derivatives, amide-forming derivatives of disulfonic acids, bis-halogen formates of glycols and their amide-forming derivatives, diisocyanates, diphenols, aliphatic diamines, and carbocyclic diamines; it is preferred that the condensates be comprised to the extent of at least 50 mol percent of piperazines and the specified class of carbocyclic dicarboxylic acids or their amide-forming derivatives. The carbocyclic diamines referred to above are diamines in which each amine group is attached to a carbocyclic ring and in which the amine groups are separated by at least 3 atoms. Examples of these diamines are m-phenylene diamine, p-phenylene diamine, 1,3-diaminocyclohexane, 1,4-diaminocyclohexane, 1,3-diamino cyclopentane, 4,4'-diaminodiphenyl, 2,2'-diaminodiphenyl, 2,2'-diaminodiphenyl ether, 4,4'-diaminodiphenyl ether, 4,4'-diaminodiphenyl sulfone, N-butyl-4,4'-diaminodiphenyl amine, bis (4-aminocyclohexyl)-methane and the like.

Melting temperatures for the polymers of this invention are conveniently determined as that temperature at which a fresh polymer sample leaves a wet molten trail as it is stroked with moderate pressure across a clean heated metal surface. A heated brass block or any suitable temperature-gradient bar may be used. Bulk polymer is supported manually or with tweezers; chip, film or powder is manipulated with a spatula. A polymer melt temperature determined in this manner is often referred to as the "sticking temperature." For purposes of simplicity, in this specification a polymer is said to be infusible when it does not melt nor stick to a hot bar at 400° C. Attempts to measure sticking temperatures or melting temperatures above 400° C. are often misleading in that the polymeric material may undergo appreciable decomposition at the elevated temperature with the result that the value determined for the sticking or melting temperature is not characteristic of the original polymeric material but rather is characteristic of the decomposition product.

Generally, those soluble polymers which are infusible have greater utility than those which melt above 300° C. and, hence, are especially preferred, since no added difficulties in processing the polymers into fibers are inherent in the characteristic of infusibility. The soluble, infusible polymers of this invention can be dry or wet spun with facility into highly useful fibers and filaments. Illustrative of especially preferred polymeric compositions of this invention which are soluble and infusible are the following formed from dimethylpiperazines:

(1) The homopolymers of the dimethylpiperazines and the acids listed below in group A, or their amide-forming derivatives, (2) Copolymers where the recurring structural units are formed from at least one of the dimethylpiperazines and at least one of the acids of group A or their amide-forming derivatives.

(3) Copolymers where the recurring structural units are formed from at least one of the dimethylpiperazines, at least one of the acids of group A or their amide-forming derivatives to the extent of at least 75 mol percent and at least one of the copolymer-forming ingredients taken from the class consisting of dicarboxylic acids and their amide-forming derivatives, amide-forming derivatives of disulfonic acid, bis-halogen formates of glycols and their amide-forming derivatives of diisocyanates to an extent not greater than 25 mol percent, (4) Copolymers where the recurring structural units are formed from at least one of the dimethylpiperazines to the extent of at least 75 mol percent, at least one of the copolymer-forming ingredients taken from the class consisting of diphenols, aliphatic diamines, carbocyclic diamines, piperazine and other substituted piperazines to an extent not greater than 25 mol percent and at least one of the acids of group A or their amide-forming derivatives, and (5) Copolymers where the recurring structural units are formed from at least one of the dimethylpiperazines to the extent of at least 50 mol percent and not greater than 75 mol percent, at least one of the copolymer-forming ingredients taken from the class consisting of carbocyclic diamines, piperazine and other substituted piperazines to the extent of at least 25 mol percent and not greater than 50 mol percent, and at least one of the acids of group A or their amide-forming derivatives.

The acids of group A consist of dicarboxylic acids in which each carboxyl group is attached to a carbocyclic ring and the carboxyl groups are separated by three to ten atoms and located at the extremities of the acid molecule, i.e., are separated as far as possible. Examples of these acids are terephthalic acid, cis-hexahydroterephthalic acid, trans-hexahydroterephthalic acid, 4,4'-bibenzoic acid, cis-4,4'-hexahydrobibenzoic acid, trans-4,4'-hexahydrobibenzoic acid, cis,cis-4,4'-dodecahydrobibenzoic acid, cis,trans-4,4'-dodecahydrobibenzoic acid, trans,trans-4,4'-dodecahydrobibenzoic acid, cis-1,3-cyclopentane dicarboxylic acid, trans-1,3-cyclopentane dicarboxylic acid, cis-1,3-cyclobutane dicarboxylic acid, trans-1,3-cyclobutane dicarboxylic acid, 1,4-naphthalene dicarboxylic acid, 1,5-naphthalene dicarboxylic acid, 2,6-naphthalene dicarboxylic acid and

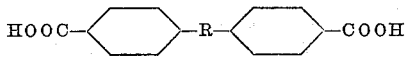

where R may be —O—, —CH$_2$—, —CH$_2$CH$_2$—, —C(CH$_3$)$_2$—, —SO$_2$—, —Si(CH$_3$)$_2$,

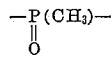

and

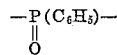

The polymeric compositions in this invention which are not infusible but which do melt above 300° C. are still very highly useful products. Their melting points are well above the range usually attributable to synthetic linear condensation polymers and, at the same time, they possess the unusual characteristic of appreciable solubility in the class of solvents heretofore defined. Illustrative of preferred polymeric compositions which are fusible and melt above 300° C. are the following formed from dimethylpiperazines:

(1) Homopolymers of the dimethylpiperazines and the acids listed below in group B, or their amide-forming derivatives, (2) Copolymers where the recurring structural units are formed from at least one of the dimethylpiperazines, at least one of the acids of group A or their amide-forming derivatives to the extent of at least 50 mol percent and not greater than 75 mol percent, and at least one of the copolymer-forming ingredients taken from the class consisting of dicarboxylic acids and their amide-forming derivatives and diisocyanates to the extent of at least 25 mol percent and not greater than 50 mol percent, (3) Copolymers where the recurring structural units are formed from at least one of the dimethylpiperazines, at least one of the acids of group A or their amide-forming derivatives to an extent not greater than 50 mol percent, and at least one of the acids of group B or their amide-forming derivatives to the extent of at least 50 mol percent, (4) Copolymers where the recurring structural units are formed from at least one of the dimethylpiperazines to the extent of at least 75 mol percent, at least one of the copolymer-forming ingredients taken from the class consisting of diphenols, aliphatic diamines, carbocyclic diamines, piperazine and other substituted piperazines to the extent of at least 25 mol percent and at least one of the acids of group B or their amide-forming derivatives, (5) Copolymers where the recurring structural units are formed from at least one of the copolymer-forming ingredients taken from the class consisting of carbocyclic diamines, piperazine, and other substituted piperazines to the extent of at least 25 mol percent and not more than 50 mol percent, and at least one of the acids of group B or their amide-forming derivatives, (6) Copolymers where the recurring structural units are formed from at least one of the dimethylpiperazines to the extent of at least 50 mol percent, at least one of the copolymer-forming ingredients taken from the class consisting of diphenols, aliphatic diamines, carbocyclic diamines, piperazine and other substituted piperazines to an extent not greater than 50 mol percent, at least one of the acids of group A or their amide-forming derivatives to the extent of at least 50 mol percent and at least one of the acids of group B or their amide-forming derivatives to an extent not greater than 50 mol percent, (7) Copolymers where the recurring structural units are formed from at least one of the dimethylpiperazines to the extent of at least 50 mol percent, at least one of the copolymer-forming ingredients taken from the class consisting of diphenols, aliphatic diamines, carbocyclic diamines, piperazine and other substituted piperazines to an extent not greater than 50 mol percent, at least one of the acids of group A or their amide-forming derivatives to the extent of at least 75 mol percent, and at least one of the copolymer-forming ingredients taken from the class consisting of dicarboxylic acids and their amide-forming derivatives, amide-forming derivatives of disulfonic acids, bis-halogen formates of glycols and their amide-forming derivatives, and diisocyanates to an extent not greater than 25 mol percent, and (8) Copolymers where the recurring structural units are formed from at least one of the dimethylpiperazines to the extent of at least 50 mol percent, at least one of the copolymer-forming ingredients taken from the class consisting of carbocyclic diamines, piperazine and other substituted piperazines to an extent not greater than 50 mol percent, and at least one of the acids of group A or their amide-forming derivatives to the extent of at least 50 mol percent and at least one of the copolymer-forming ingredients taken from the class consisting of dicarboxylic acids, and their amide-forming derivatives, amide-forming derivatives of disulfonic acids, bis-halogen formates of glycols and their amide-forming derivatives, and diisocyanates to an extent not greater than 50 mol percent.

The acids of group B consist of those members of the specified class of carbocyclic dicarboxylic acids not included in group A above, and preferably group B consists of dicarboxylic acids in which each carboxyl group is attached to a carbocyclic ring and the carboxyl groups are separated by at least three atoms and located at other than the extremities of the acid molecule, i.e., are not separated to the maximum extent possible. For example, group B includes isophthalic acid, cis-hexahydroisophthalic acid, trans-hexahydroisophthalic acid, the bibenzoic acids and their hydrogenated derivatives where one of the carboxyl groups may be in the 4-position but not both, and acids of the formula

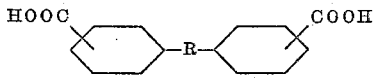

where one of the carboxyl groups may be in the 4 position but not both and where R may be —O—, —CH$_2$—, —CH$_2$CH$_2$—, —C(CH$_3$)$_2$—, —SO$_2$—, —OCH$_2$CH$_2$O—, —Si(CH$_3$)$_2$—,

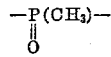

and

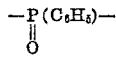

Some polymers of this invention may be prepared by polymerization in the presence of a solvent, preferably a high boiling solvent which is not lost under the conditions of the reaction, e.g., phenol, hydroxy-diphenyl, dinaphthol, p-toluene sulfonethylamide, etc., employing methods similar to those disclosed by Spanagel, U.S. Patent No. 2,214,442. By this means it is possible to keep the temperature in the polymerizing vessel below the decomposition temperature of the polymerizing ingredients and of the resulting polymer and, at the same time, carry on the reaction in the liquid phase, even to the point of preparing high polymer.

Where the solvents employed in the preparation of the polymer are not desired in the further processing of the polymer, they may be removed by washing the polymer with a liquid which is compatible with the solvent, but which has no solvent action for the polymer itself. Where penols have been used as the solvents for the polymer, weak aqueous alkali solutions may be employed to rid the polymer of these materials. Where the phenolic solvents used in the polymerizing step form low boiling azeotropes with other liquids, e.g., halogenated hydrocarbons, these latter liquids may be added in sufficient quantity to the phenolic solution of the polymer to change the solvent to the composition of the azeotrope. This solution, now containing the solvent as a low-boiling azeotrope, may be suitable for wet or dry spinning directly without further adjustment. In those instances where the concentration of the original high boiling solvent is not such as to give a final solution concentration, after the addition of the low boiling azeotrope-forming member, suitable for spinning, the concentration can be adjusted by adding azeotropic solvent or by adding polymer freed of solvent as may be required.

Another and more widely applicable method for the preparation of the polymers of this invention is a rapid, moderate temperature, interfacial condensation wherein the reactants are brought together in such a way that the reaction zone is at or is immediately adjacent to a liquid-liquid interface and most of the molecules of at least one of the reactants must diffuse through liquid diluent to arrive at the reaction zone. The reactants in one liquid phase may be one or more of the piperazines alone or in combination with such compounds as organic primary diamines, organic secondary diamines, diphenols, and dithiols in any proportion as may be desired. The reactants in the other liquid phase may be a diacid halide of one or more of the dibasic carbocyclic acids alone or in combination with such compounds as the acid halides, bis-halogen formates of glycols and diisocyanates in any proportion as may be desired. However, for purposes of simplicity the description of this reaction will be in terms of a diamine and a diacid halide to produce a polyamide.

The process for accomplishing this rapid, moderate temperature interfacial condensation comprises bringing together the diamine in one liquid phase and the diacid halide in the second liquid phase, immiscible with the first phase, mixing the liquid phases to form a system comprised of two liquid phases such that the diamine and the diacid halide are in separate phases and at least one of the phases includes a liquid diluent, maintaining the phases in admixture until the desired condensation polymerization has taken place and then, if desired, separating the resulting polyamides. Preferably, a reactant is a liquid under the reaction conditions or is dissolved in a diluent, but one of the reactants may be a finely divided solid, dispersed or suspended in a diluent in which the reactant is at least partially soluble. The organic diacid halide may be a diacid fluoride, a diacid chloride, a diacid bromide, a diacid iodide or a mixed diacid halide.

The above process may be carried out with a large number of variations, not all of which are equally adaptable to the preparation of each specific polyamide. The broad methods, falling within the purview of this new process and depicted in the examples hereinafter set forth, include the following: (1) non-aqueous systems in which at least one of the reactants is dissolved or dispersed in a diluent or diluents such that at least two liquid phases are obtained upon the initial mixing, and (2) aqueous systems in which the diamine is dissolved or dispersed in water, or water and another diluent, and in which the diacid halide is undiluted or is dissolved in a non-aqueous liquid diluent of such character that on mixing the liquids a system of two liquid phases is obtained initially.

It will be seen that the first broad method encompasses such variations as (a) a diamine dissolved or dispersed in a non-aqueous liquid diluent and reacted with a liquid diacid halide which is substantially insoluble in this non-aqueous diluent, (b) a diacid halide dissolved or dispersed in a non-aqueous liquid diluent and reacted with a liquid diamine which is substantially insoluble in this non-aqueous liquid diluent, (c) a diamine dissolved or dispersed in a non-aqueous liquid diluent and reacted with a diacid halide dissolved or dispersed in a non-aqueous diluent such that the two non-aqueous diluents are immiscible, and (d) either a diamine or a diacid halide dissolved or dispersed in an emulsion of non-aqueous diluents and reacted with the other reactant, which may be diluted with a non-aqueous diluent immiscible with one of the diluents for the first reactant.

With respect to broad method Number 2, described above, it is seen that the following variations are included therein, (a) a diamine dissolved or dispersed in water and reacted with a liquid diacid halide, (b) a diamine dissolved or dispersed in water and reacted with a diacid halide dissolved or dispersed in a non-aqueous liquid diluent which is immiscible with water, and (c) a diamine dissolved or dispersed in an emulsion of water and non-aqueous diluent and reacted with a diacid halide, which may be diluted with a water-immiscible diluent.

For purposes of convenience, the polymerization process delineated in the paragraphs directly above shall hereinafter be called inter-facial polymerization. Furthermore, whenever a reactant is said to be "dispersed" in a diluent, in addition to the more usual meaning which encompasses the suspension of small discrete particles of solid or liquid in a diluent, this expression is intended to include cases in which the reactant is dissolved in a diluent, and "dispersion" is intended to include true solutions. While there is a technical difference between dispersions and true solutions, they are often difficult to distinguish and the two are equivalent in the practice of this invention.

The process for the preparation of polyamides by interfacial polymerization can be carried out over a considerable range of temperatures from just above the freezing point of the phase having the highest freezing point up to temperatures at which decomposition products form to an objectionable extent. However, in view of the rapidity with which fiber-forming polyamides are formed at moderate temperatures, there is no advantage in using temperatures higher than 150° C. and it is preferred that the reaction be carried out in the moderate temperature range of —10° C. to +60° C.

It is essential that the solvent or diluent employed for a specific reactant be inert toward it. It is not essential, however, that the solvent or diluent used in one phase be completely inert to the reactant in the other phase. Generally speaking, it is essential that the two reactants be more reactive toward each other than either reactant is to the solvent or diluent of the other phase. If this were not the case, the yield of polyamide would be greatly reduced, or might even be non-existent.

Since the reaction rate of diamines with diacid halides is rapid at room temperature, it is preferable that the addition of the two phases containing the separate reactants be accompanied by sufficiently rapid stirring to produce an emulsion of fine particle size. Such emulsions may be equally well produced by other means, for example, by impinging two high velocity liquid streams upon each other in a suitable manner. When an emulsion of fine particle size is provided the available diamine and/or the diacid halide is completely used up in a matter of a few seconds or, at most in a matter of a few minutes, depending to an extent on the sum total of the reaction conditions.

When fibers are prepared from polyamides by spinning from the melt or by spinning from solution at elevated temperatures in the range of 150° to 300° C., a further polyamidation reaction is likely to occur because the polymer chain still contains terminal amide-forming groups. When this occurs the molecular weight and melt viscosity both increase. Such changes in viscosity and molecular weight may constitute a serious problem in the preparation of uniform filaments. This can be overcome by treating the unstabilized polyamide with a monofunctional reactant, such as a mono-amine of a mono acid halide, and thus block off the remaining amide-forming end groups to form a stabilized polymer. An alternative method is to employ a monofunctional amine or a monofunctional acid chloride as a stabilizer in the polyamide-forming reaction of this invention. Small amounts of these monofunctional reactants, for example, from 0.1 to 5 mol percent, will enter into the reaction during the formation of polyamide chains and serve as non-reactive end groups for these chains. Consequently, when such a polymer is subsequently heated for the purposes of melt spinning, neither the molecular weight nor the viscosity will increase, since there are no amide-forming terminal groups in the polyamide. Thus, a melt-stable polyamide is obtained which has considerably more utility than the unstabilized material for this particular use.

Surprisingly, contrary to the teachings of the prior art, relatively impure reactants may be employed in the process of this invention. For example, dicarboxylic acids frequently constitute major impurities in diacid halides. These dicarboxylic acids do not react under the conditions employed for the process of this invention and consequently do not enter into the polyamide formation. Instead they remain in the spent reaction liquor and are easily separated from the solid precipitated polyamide. Likewise, it has been found that the diamine may be grossly contaminated with diamine carbonate, an impurity which is difficult to prevent. All manner of impurities which are non-reactive with either of the reactants under the conditions of this polymerization may be present without affecting the constitution or the purity of the resultant polyamide. These impurities will not be part of the polyamides produced and will either remain in the spent reaction liquor or, should they be insoluble in the diluents employed, they can be readily leached from the polyamide by simply percolating an appropriate solvent through a bed of the collected polyamide. If any impurity is valuable as a starting material for the preparation of a reactant, it can be recovered from the spent liquor and then be converted to the reactant for use in the process. In this way the efficiency of the over-all reaction can be improved for impure reactants and the cost of the final product correspondingly reduced. Monofunctional reactants of the type described above which serve as stabilizers are, of course, not to be considered among the classes of impurities which can be tolerated in large amounts.

Another surprising feature of this method which is contrary to the teachings of the prior art is that the reactants do not need to be employed in equivalent proportions. The excess of one reactant simply remains in the supernatant liquid from which the polyamides precipitate. It has been found that the process of interfacial polymerization of diamines with diacid halides yields polyamides of high molecular weight whether one reactant is in excess by 300% or even more, or whether the reactants are in equivalent or nearly equivalent amounts. For purposes of economy, it is usually desirable to employ the reactants in equivalent or nearly equivalent amounts.

The concentration of the reactants in the separate liquid phases can vary over wide limits and still produce high molecular weight polyamides. Either reactant, but not both, may be employed in 100% concentration as the pure compound. Likewise, either reactant may be employed in a very low concentration in its separate liquid phase, for example, concentrations as low as 0.1% or even lower are useful.

It is sometimes advantageous to employ an emulsifying agent to assist in suspending one liquid phase in the other. To this end, water or organic soluble emulsifying agents may be used. Examples of organic soluble agents are the "Spans" (Atlas Powder Co., sorbitan monofatty acid esters), the higher fatty alcohols, the higher fatty alcohol esters, "Naccolene F" (Allied Chem. and Dye Co., alkyl aryl sulfonate) "Acto 700" (Stanco Inc., sodium petroleum sulfonate), "Alkaterge C" (Commercial Solvents Corp. substituted oxazoline), "Betanols" (Beacon Co. high molecular weight esters) "Duponol" OS (E. I. du Pont de Nemours and Company, higher alcohol derivative), etc.

Where one phase is aqueous, the emulsifying agents may be cationic, anionic or non-ionic. Representative examples of cationic emulsifying agents are "Lorol" pyridinium chloride ("Lorol" is the trade-name for the mixture of aliphatic alcohols obtained by hydrogenation of coconut oil), "Triton K-60" (Rohm and Haas Co., cetyl dimethyl benzyl ammonium chloride) "Nopcogen 17L" (Nopco Chem. Co., a hydroxylated polyamide). Representative examples of non-ionic agents are the "Tweens," (Atlas Powder Co., polyoxyethylene derivatives of sorbitan monoesters of long-chain fatty acids), "Triton N-100" (Rhom and Haas Co., alkylated aryl polyether alcohol), the "Elvanols" (E. I. du Pont de Nemours and Company, partially hydrolyzed polyvinyl acetates of various molecular weights), etc. and representative examples of the anionic emulsifying agents are soaps, the amine salts, "Duponol WA" (E. I. du Pont de Nemours and Company, alcohol sulfate), "Aerosol OT" (American Cyanamid Co., dioctyl ester of sodium sulfosuccinic acid) "Aresklene 400" (Monsanto Chemical Co., dibutyl phenol sodium disoulfonate) "MP-189S" (E. I. du Pont de Nemours and Company, hydrocarbon sulfonate), etc.

It is likewise desirable to use an acid acceptor for the hydrogen halide which is liberated in the course of the reaction of the organic primary or secondary diamine with the organic dicarboxylic acid halide. The diamine itself can serve as the acid acceptor by forming the amine salt. Since the amine salt is incapable of reacting with the diacid halide, it is desirable in this instance to start with at least 2 equivalents of diamine for every equivalent of diacid halide to ensure that all the diacid halide is used up. To circumvent the necessity for using this large excess of diamine, it is necessary merely to add an acid acceptor, preferably to the liquid phase containing the diamine. When the amount of added acid acceptor is equivalent to the amount of liberated hydrogen halide, none of the diamine will be rendered unreactive. Larger amounts or lesser amounts of the added acid acceptor may be employed. The added acid acceptor may range from zero up to an amount equivalent to 15 times the diamine present or even more. Preferably, the added acid acceptor, if one is used, will be in the range of 1 to 3 times the amount equivalent to the diamine present. To be effective, the added acid acceptor must be a stronger base than the diamine contained in the same liquid phase so that the hydrogen halide preferentially reacts with the added acid acceptor. Depending on the basicity of the diamine the added acid acceptor may be caustic alkali, an alkali carbonate or other salt of a strong base and a weak acid, a tertiary organic base or the like.

These basic materials may be added directly to one of the liquid phases or sometimes to both the liquid phases either before or during the course of the reaction; or if these basic materials are not added at this stage, they may be added to the spent reaction liquor as a means of reforming the diamine from the diamine hydrohalide, so that the diamine may be put through the reaction again. As can be seen in the examples hereinafter set forth, the liquid phase containing the diamine can be strongly alkaline and still not prevent the preferential reaction of the diacid halide with the diamine.

It is sometimes desirable to load the solvent for the respective reactants with non-reactive solutes so as to produce, for example, a better yield, or a higher molecular weight, or a more useful polyamide. Such non-reactive substances may be salts such as sodium chloride, potassium bromide, lithium sulphate and the like for loading the aqueous phase.

Importantly, this method of producing polyamides yields the final product in an extremely short period of time after the reaction is initiated. As a result, an enormous productivity can be achieved from relatively small amount of floor space. The process also gives the polyamides, in a finely divided or granular state, which are readily dissolved for the purposes of wet spinning or dry spinning.

The following examples illustrate some of the preferred polymer compositions of this invention and some of the conditions under which they can be effectively produced but are not to be construed as limiting the scope of the invention. In these examples the inherent viscosity values of the products are given as an indication of the degree of polymerization obtained. In view of the relative ease with which these values are determined, they provide a useful method of evaluating the effectiveness of the process conditions and the potential utility of the polymers. The values may be misleading when used to compare different types of polyamides or copolymers but, in general, those having values of at least about 0.3 were spinnable. In determining these values, viscosimeter flow times were obtained at $25.0 \pm 0.1°$ C. for a solvent of the polyamide and for a solution of the polyamide in the solvent at a concentration of 0.5 gram per 100 cubic centimeters of solution. The inherent viscosity value was then calculated as 2 times the natural logarithm of the relative viscosity of the solution compared to that of the pure solvent.

EXAMPLE 1

Copolyamide from 2,5-dimethylpiperazine: cis-hexahydroterephthaloyl chloride/trans - hexahydroterephthaloyl chloride (100:83/17)

To an ice-cooled mixture consisting of 2.5 liters of water, 1 mol sodium carbonate, 0.55 mol 2,5-dimethylpiperazine, 1 liter of methylene chloride under vigorous agitation was added 0.415 mol cis-hexahydroterephthaloyl chloride in 0.085 mol trans-hexahydroterephthaloyl chloride in 0.5 liter methylene chloride. The temperature rose from 0° to 7° C. The yield was 98% with inherent viscosity in m-cresol of 1.66. The polymer did not melt below 400° C. It was dry-spun from an 80/20 by weight ethanol-water solution containing 19.5% solids to give a fiber which could be drawn 5× at 300° C. A strong fiber resulted. The polymer was soluble in 88/12 by weight chloroform-methanol, acetic acid, hot chloroform, and trichloroethane.

EXAMPLE 2

Copolyamide from 2,5-dimethylpiperazine: cis-hexahydroterephthaloyl chloride/trans - hexahydroterephthaloyl chloride (100:58/42)

To an ice-cooled mixture of 2.5 liters water, 0.55 mol of 2,5-dimethylpiperazine, 1 mol of sodium carbonate, 1 liter methylene chloride, under vigorous stirring was added 0.29 mol of cis-hexahydroterephthaloyl chloride, and 0.21 mol trans-hexahydroterephthaloyl chloride in 0.5 liter of methylene chloride. The temperature rose from 1 to 8.5° C. The yield was 95% with inherent viscosity in m-cresol of 2.1. It was spun from 88/12 by weight chloroform-methanol solution containing 17% solids. The resulting fiber was drawn 2.8× at 290° C. The drawn boiled-off fiber had a tenacity of 2.3 g.p.d. at 3.4% elongation. The polymer was soluble in 80/20 ethanol-water, 95/5 acetic acid-water, and 70/30 trichloroethane-acetic acid, all proportions being by weight.

EXAMPLE 3

Copolyamide from 2,5-dimethylpiperazine: cis-hexahydroterephthaloyl chloride/trans - hexahydroterephthaloyl chloride (100:30/70)

To an ice-cooled mixture of 2.5 liters of water, 0.55 mol 2,5-dimethylpiperazine, 1 mol of sodium carbonate, 1.5 liters methylene chloride was added under vigorous stirring 0.75 liter of methylene chloride containing 0.15 mol cis-hexahydroterephthaloyl chloride and 0.35 mol trans-hexahydroterephthaloyl chloride. The temperature rose from 0 to 7.5° C. The yield was 98% with inherent viscosity in m-cresol of 1.52. The polymer remained solid above 400° C. The polymer was dry spun from 70/30 (by weight) acetic/formic acid to give a fiber which could be drawn 3× at 330° C. The polymer was soluble in 88/12 chloroform-methanol, 95/5 acetic acid-water, 70/30 trichloroethane/-acetic acid and lactonitrile, all parts being by weight.

EXAMPLE 4

Copolyamide from 2,5-dimethylpiperazine: terephthaloyl chloride/cis - hexahydroterephthaloyl chloride/trans-hexahydroterephthaloyl chloride (100:50/26/24)

In a Waring Blendor jar were placed 143 ml. of a 10% potassium carbonate-10% potassium bicarbonate buffer solution an aqueous solution containing 0.028 mol of 2,5-dimethylpiperazine and 25 ml. of methylene chloride. The stirred emulsion was cooled to 0° C. and a mixture of 2.6 g. (0.0125 mol) of terephthaloyl chloride and 2.6 g. (0.0125 mol) hexahydroterephthaloyl chloride (52% cis and 48% trans isomers) in 25 mml. of methylene chloride was added. After stirring 15 minutes the methylene chloride was evaporated on the steam bath. The white granular polymer was filtered, washed several times with hot water to remove excess inorganic salts and dried. The polymer weighed 6.2 g., a 100% yield, did not melt below 400° C. and had an inherent viscosity of 2.14. It was soluble in ethylene chlorohydrin, formic acid, chloroform/methanol azeotrope (88/12 by weight) and formic acid/chloroform azeotrope (15/85 by weight) at room temperature. The polymer was dry-spun from solution in chloroform-methanol azeotrope to give a yarn which was drawn 3× at 300° C. The drawn yarn had a tenacity of 2.7 g.p.d. at 13% elongation.

EXAMPLE 5

*Copolyamide from 2,5-dimethylpiperazine: terephthaloyl chloride/cis-hexahydroterephthaloyl chloride/trans-hexahydroterephthaloyl chloride (100:90/5.2/4.8)*

In a Waring Blendor jar was placed 143 ml. of a 10% potassium carbonate-10% potassium bicarbonate buffer solution, an aqueous solution containing 0.028 mol of 2,5-dimethylpiperazine and 25 ml. of methylene chloride. The stirred emulsion was cooled to 0° C. and a mixture of 4.6 g. (0.0225 mol) of terephthaloyl chloride and 0.5 g. (0.0025 mol) of hexahydroterephthaloyl chloride (52% cis and 48% trans isomers) in 25 ml. of methylene chloride was added. After stirring 5 minutes the methylene chloride was evaporated on the steam bath. The granular polymer was filtered, washed well with hot water and dried. It weighed 6.0 g., a 98% yield, did not melt below 400° C. and had an inherent viscosity of 1.78. It was soluble in ethylene chlorohydrin, formic acid, chloroform/methanol azeotrope (88/12 by weight), formic acid/chloroform azeotrope (15/85 by weight) and methylene chloride/methanol azeotrope (92/8 by weight) at room temperature. The polymer was dry-spun from solution in chloroform-formic acid azeotrope.

EXAMPLE 6

*Polyamide from 2,5-dimethylpiperazine: 2,2-bis(p-carboxyphenyl) propane diacid chloride*

In a Waring Blendor were placed 147 ml. of a 10% potassium carbonate-10% potassium bicarbonate buffer solution, an aqueous solution containing 0.0138 mol of 2,5-dimethylpiperazine and 25 ml. of methylene chloride. To the cooled, stirred emulsion was added 4.0 g. (0.0125 mol) of 2,2-bis (p-carboxyphenyl) propane diacid chloride in 25 ml. of methylene chloride. The emulsion was stirred for 30 minutes at 0° C. and then stirred for 1 hr. at room temperature. After removal of methylene chloride on the steam bath, the tan colored chunky polymer was filtered, washed well and dried. It weighed 4.6 g., a 100% yield, and became sticky at 400° C. The inherent viscosity was 2.00. This polymer was soluble in chloroform, ethylene chlorohydrin, formic acid, chloroform/methanol azeotrope (88/12 by weight) and formic acid/chloroform azeotrope (15/85 by weight) at room temperature.

EXAMPLE 7

*Polyamide from 2,5-dimethylpiperazine: cis-hexahydro-isophthaloyl chloride*

In a Waring Blendor jar was placed 5.3 g. (0.05 mol) of sodium carbonate, an aqueous solution containing 0.0138 mol of 2,5-dimethylpiperazine, 147 ml. of water and 25 ml. of methylene chloride. To the cooled, stirred emulsion was added 2.6 g. (0.0125 mol) of cis-hexahydroisophthaloyl chloride in 25 ml. of methylene chloride. The polymer was isolated by evaporating the methylene chloride on the steam bath. This polymer was apparently somewhat soluble in methylene chloride as it did not appear in the solid form until the methylene chloride had been removed. After drying, the polymer weighed 2.2 g., a 71% yield, and had an inherent viscosity of 0.38. It became sticky on a hot bar at 310° C. This polymer was soluble in chloroform, 80% ethanol, ethylene chlorohydrin, formic acid, chloroform/methanol azeotrope (88/12), and formic acid/chloroform azeotrope (15/85) at room temperature, all in parts by weight.

EXAMPLE 8

*Polyamide from 2,5-dimethylpiperazine: terephthaloyl chloride*

To a Waring Blendor jar at room temperature was added 10.6 g. (0.1 mol) of sodium carbonate, 105 cc. of water, 45 cc. (0.055 mol) of an aqueous 2,5-dimethylpiperazine solution, and 50 cc. of methylene chloride. To the rapidly stirred mixture was added 10.15 g. (0.05 mol) of terephthaloyl chloride dissolved in 50 cc. of methylene chloride. The reaction mixture was poured into a beaker and the methylene chloride evaporated off on a steam bath. The polymer was then isolated, washed and dried. The yield was 12 g., and the inherent viscosity in m-cresol was 1.53. The polymer sticking temperature of the polymer was above 400° C. It was soluble and was dry-spun from solution into strong fibers.

EXAMPLE 9

*Polyamide from 2,5-dimethylpiperazine: isophthaloyl chloride*

To a Waring Blendor jar at room temperature was added 10.6 g. (0.1 mol) of sodium carbonate, 85 cc. of water, 65 cc. (0.055 mol) of an aqueous 2,5-dimethylpiperazine solution, and 25 cc. of benzene. To the rapidly stirred mixture was added 10.6 g. (0.05 mol) of isophthaloyl chloride dissolved in 25 cc. of chloroform. The organic solvent was evaporated on a steam bath and the polymer was isolated, washed and dried. The yield was 11.5 g. and the inherent viscosity in m-cresol was 1.49. This polymer has a polymer sticking temperature of 315° C. It is very soluble in such solvents as chloroform, methanol-chloroform (12/88 by weight), 1,1,2-trichloroethane and acetic acid.

EXAMPLE 10

*Copolyamide from 2,5-dimethylpiperazine: terephthaloyl chloride/isophthaloyl chloride (100:50/50)*

To a Waring Blendor jar at room temperature was added 10.6 g. (0.1 mol) of sodium carbonate, 150 cc. of water, 45 cc. (0.055 mol) of an aqueous 2,5-dimethylpiperazine solution, and 50 cc. of methylene chloride. To the rapidly stirred mixture was added 5.08 g. (0.025 mol) of terephthaloyl chloride and 5.08 g. (0.025 mol) of isophthaloyl chloride dissolved in 50 cc. of methylene chloride. The methylene chloride was evaporated off on a steam bath and the polymer was isolated, washed and dried. The yield was 12 g. and the inherent viscosity in m-cresol was 1.11. The polymer sticking temperature was 380° C. It is very soluble in such solvents as chloroform, methanolchloroform (12/88 by weight), 1,1,2-trichloroethane, acetic acid and dimethylformamide.

EXAMPLE 11

*Copolyamide from 2,5-dimethylpiperazine: terephthaloyl chloride/isophthaloyl chloride (100:80/20)*

To a Waring Blendor jar at room temperature was added 4.0 g. (0.1 mol) of sodium hydroxide, 60 cc. of water, 60 cc. (0.055 mol) of an aqueous solution of 2,5-dimethylpiperazine and 25 cc. of benzene. To the rapidly stirred mixture was added 8.13 g. of terephthaloyl chloride and 2.03 g. of isophthaloyl chloride dissolved in 25 cc. of chloroform. The polymer was isolated, washed and dried. The yield was 12 g. and the inherent viscosity in m-cresol was 1.37. This polymer had a sticking temperature above 400° C. It was soluble in solvents such as formic acid-chloroform (15/85), methanol-chloroform (12/88) and methanol-methylene chloride (8/92), all parts by weight. This polymer was dry-spun from solution to yield yarn which was drawn 3.5×.

The yarn tenacity was 2.8 g.p.d. at an elongation of 30%. This yarn had a fiber sticking temperature of 298° C., and the fabric was ironed at the highest temperature on the linen setting on an automatic hand iron without any ill effects.

EXAMPLE 12

*Copolymer from 2,5-dimethylpiperazine: terephthaloyl chloride/ethylene bis-chloroformate (100:75/25)*

To a Waring Blendor jar at room temperature was added 10.6 g. (0.1 mol) of sodium carbonate, 150 cc. of water, 15 cc. (0.055 mol) of an aqueous 2,5-dimethylpiperazine solution, 20 cc. of a 5% "Duponol" ME solution, and 25 cc. of methylene chloride. To the rapidly stirred system was added 7.63 g. of terephthaloyl chloride and 1.62 cc. of ethylene bis-chloroformate dissolved in 25 cc. of methylene chloride. Acetone was added to break the emulsion and the polymer was isolated, washed and dried. The yield was 11 g. and the inherent viscosity in m-cresol was 1.16. This polymer had a sticking temperature above 400° C. and was soluble in solvents such as chloroform, methanol-chloroform (12/88), formic acid-chloroform (15/85) and hot acetic acid, all parts by weight. This polymer was dry-spun from solution to yield fibers which were drawn 5×. The yarn tenacity was 5.2 g.p.d. at an elongation of 20%. The yarn had a fiber sticking temperature above 400° C.

EXAMPLE 13

*Polyamide from 2,5-dimethylpiperazine: bibenzoyl chloride*

To a Waring Blendor jar at room temperature was added 10.6 g. (0.1 mol) of sodium carbonate, 135 cc. of water, 15 cc. (0.055 mol) of an aqueous 2,5-dimethylpiperazine solution and 50 cc. of methylene chloride. To the rapidly stirred mixture was added quickly 14 g. (0.05 mol) of bibenzoyl chloride suspended in 100 cc. of hot methylene chloride. The reaction mixture was set up into a gelatinous mass which was heated on the steam bath to remove the methylene chloride. The polymer was isolated, washed and dried. The yield was 16 g. and the inherent viscosity in m-cresol was 3.52. This polymer had a sticking temperature above 400° C. and was soluble in solvents such as methanol-chloroform (12/88), formic acid-chloroform (15/85) and ethylene chlorohydrin, all parts by weight. This polymer was dry-spun from solution into strong yarns.

EXAMPLE 14

*Copolyamide from 2,5-dimethylpiperazine: mixed naphthalene dicarboxylic acid chlorides*

To a Waring Blendor jar at room temperature was added 21 cc. (0.1 mol) of sodium hydroxide solution, 105 cc. of water, 28 cc. (0.055 mol) of an aqueous 2,5-dimethylpiperazine solution and 25 cc. of benzene. To the stirred system was added 12.66 g. (0.05 mol) of the mixture of naphthalene dicarboxylic acid chlorides dissolved in 50 cc. of methylene chloride. The reaction mixture formed a gelatinous mass which was heated on a steam bath to remove the methylene chloride. The polymer was isolated, washed and dried. The yield was 13 g. and the inherent viscosity in m-cresol was 0.56. The polymer had a sticking temperature above 400° C. and was soluble in solvents such as chloroform, methanol-chloroform (12/88 by weight) 1,1,2-trichloroethane and acetic acid.

EXAMPLE 15

*Polyamide from 2,5-dimethylpiperazine and cis-hexahydroterephthaloyl chloride*

Methylene chloride (100 ml.) was emulsified with a solution of 6.3 g. (0.055 mol) of 2,5-dimethylpiperazine and 10.6 g. (0.1 mol) of sodium carbonate in 250 ml. of water using a Waring Blendor. To the cooled (6° C.) stirred emulsion was added a solution of 10.45 g. (0.05 mol) of cis-hexahydroterephthaloyl chloride in 50 ml. of methylene chloride. The polymer was isolated, washed and dried. The white powder weighed 11.5 g. and had an inherent viscosity of 2.26 in m-cresol. The polymer did not melt up to 400° C. The polymer was soluble in chloroform-methanol (88/12) and ethanol-nitromethane (73/27), as parts by weight.

EXAMPLE 16

*Polyamide from 2,5-dimethylpiperazine and trans-hexahydroterephthaloyl chloride*

A solution of 6.3 g. (0.055 mol) of 2,5-dimethylpiperazine and 10.6 g. (0.1 mol) of sodium carbonate in 290 ml. of water was emulsified with 100 ml. of methylene chloride. To the cooled (7° C.) emulsion was added a solution of 10.45 g. (0.05 mol) of trans-hexahydroterephthaloyl chloride in 50 ml. of methylene chloride. The reaction mixture became thick and difficult to stir so another 100 ml. of water was added. The methylene chloride was evaporated and the polymer was isolated. After washing with water and drying there was 11.3 g. (90% of the theoretical). The inherent viscosity in trichloroethane phenol was 1.25. The polyamide did not melt up to 400° C., and it was soluble in chloroform-formic acid azeotrope (85/15 by weight) and ethylene chlorohydrin. A clear, flexible film was cast from the first solvent.

EXAMPLE 17

*Copolyamide from 2,5-dimethylpiperazine/N,N'-diisobutylhexamethylenediamine: terephthaloyl chloride (80/20:100)*

An emulsion was prepared from 150 ml. of water containing 6.4 g. of $Na_2CO_3$ and 0.0264 mol of 2,5-dimethylpiperazine and 75 ml. of methylene chloride containing (0.0066 mol) of N,N'-diisobutyl-hexamethylenediamine. To the stirred, cooled emulsion was added a solution of 6.1 g. (0.03 mol) of terephthaloyl chloride in 50 ml. of methylene chloride. The polymer was isolated, washed with hot water and dried. The yield was 8.3 g. (98% of theoretical). The white granular solid did not melt up to 400° C. It was soluble in chloroform-formic acid azeotrope and had an inherent viscosity of 0.81 in m-cresol.

EXAMPLE 18

*Copolymer from 2,5-dimethylpiperazine/piperazine: terephthaloyl chloride/ethylene bis-chloroformate (51/49:55/45)*

To a Waring Blendor jar at room temperature was added 10.6 g. (0.10 mol) of sodium carbonate, 150 cc. of water, 25 cc. of a 5% solution of "Duponol" ME, 19.35 cc. (0.0245 mol) of an aqueous piperazine solution, 11.35 cc. (0.0255 mol) of an aqueous 2,5-dimethylpiperazine solution and 25 cc. of benzene. To the rapidly stirred emulsion was added 5.59 g. (0.0275 mol) of recrystallized terephthaloyl chloride and 2.93 cc. (0.0225 mol) of ethylene bis-chloro-formate dissolved in 25 cc. of benzene. The polymer was isolated, washed and dried. The yield was 9.0 g. and the inherent viscosity in m-cresol was 0.98. The polymer had a sticking temperature of 310° C., and it was soluble in such dry-spinning solvents as 15/85 formic acid chloroform and 12/88 methanol-chloroform.

EXAMPLE 19

*Copolymer from 2,5-dimethylpiperazine/resorcinol: terephthaloyl chloride (75/25:100)*

To a Waring Blendor jar at room temperature was added 1.38 g. (0.0125 mol) of resorcinol dissolved in 20 cc. (0.10 mol) of an aqueous sodium hydroxide solution, 15.5 cc. (0.0375 mol) of an aqueous solution of 2,5-dimethylpiperazine, 130 cc. of water and 25 cc. of methylene chloride. To the rapidly stirred system was added 10.15 g. (0.05 mol) of recrystallized terephthaloyl chloride dissolved in 25 cc. of methylene chloride. The polymer was isolated, washed and dried. The yield was 10.0 g., and the inherent viscosity in m-cresol was 0.97. The polymer did not melt up to 400° C. The polymer was soluble in such dry-spinning solvents as 15/85 formic acid-chloroform and 12/88 methanol-chloroform.

EXAMPLE 20

*Copolymer from 2,5-dimethylpiperazine/diphenylolpropane: terephthaloyl chloride (75/25:100)*

To a Waring Blendor jar at room temperature was added 150 cc. of water, 4.0 g. (0.10 mol) of sodium hydroxide, 2.85 g. (0.0125 mol) of diphenylolpropane, 9.0 cc. (0.0375 mol) of an aqueous 2,5-dimethylpiperazine solution, and 25 cc. of methylene chloride. To the rapidly stirred system was added 10.15 g. (0.05 mol) of recrystallized terephthaloyl chloride dissolved in 25 cc. of methylene chloride. The polymer was isolated, washed and dried. The yield was 14.0 g., and the inherent viscosity in m-cresol was 0.82. The polymer did not melt below 400° C. The polymer is soluble in such dry-spinning solvent as 15/85 formic acid-chloroform and 12/88 methanol-chloroform.

EXAMPLE 21

*Polyamide from 2,5-dimethylpiperazine and 1,3-cyclopentane-dicarboxylic acid*

To a solution of 1.14 g. (0.01 mol) of 2,5-dimethylpiperazine and 2.3 g. of $Na_2CO_3$ in 50 ml. of water was added 10 ml. of cyclohexane. To the stirred cooled (5° C.) emulsion was added a solution of 0.01 mol of 1,3-cyclopentanedicarboxylic acid chloride in 20 ml. of methylene chloride. The polyamide was isolated, washed with water and dried. The inherent viscosity in m-cresol was 0.93. The polymer was soluble in chloroform-methanol (88/12) and did not melt when heated to 350° C.

EXAMPLE 22

*Copolyamide from 2,6-dimethylpiperazine/3-methoxy-hexamethylenediamine: terephthaloyl chloride (90/10:100)*

In a Waring Blendor there was placed a solution of 3.69 g. (0.0324 mol) of 2,6-dimethylpiperazine, 0.52 g. (0.0036 mol) of 3-methoxyhexamethylenediamine and 2.4 g. (0.06 mol) of sodium hydroxide in 150 ml. of water. Stirring was started and 75 ml. of methylene chloride was added to the aqueous solution. A solution of 6.09 g. (0.03 mol) of terephthaloyl chloride in 50 ml. of methylene chloride was added to this stirred emulsion. The stirring was continued for 4 minutes. The methylene chloride was boiled off on a steam bath. The polymer was washed with water twice in a Waring Blendor and then dried in vacuo at 80° C. The polymer had an inherent viscosity in m-cresol of 0.21 and it did not melt below 360° C.

EXAMPLE 23

*Polyamide from 2,6-dimethylpiperazine and terephthaloyl chloride*

In a Waring Blendor there was placed a solution of 3.49 g. (0.03 mol) of 2,6-dimethylpiperazine and 7.44 g. (0.06 mol) of sodium carbonate monohydrate in 150 ml. of water. Stirring was started and 75 ml. of methylene chloride was added to the aqueous solution. To this stirred emulsion there was added a solution of 6.09 g. (0.03 mol) of terephthaloyl chloride in 50 ml. of methylene chloride. The mixture was stirred for 2 minutes and then the methylene chloride was boiled off on a steam bath. The polymer was washed twice with water in a Waring Blendor and then dried in vacuo at 80° C. The yield was 91%. The polymer had an inherent viscosity of 0.73 in m-cresol and it did not melt below 360° C.

EXAMPLE 24

*Copolyamide of 2,6-dimethylpiperazine/2,5-dimethylpiperazine: terephthaloyl chloride (50/50:100)*

In a Waring Blendor there was placed a solution of 2.05 g. (0.018 mol) of 2,6-dimethylpiperazine, 2.05 g. (0.018 mol) of 2,5-dimethylpiperazine and 2.4 g. (0.06 mol) of sodium hydroxide in 150 ml. of water. Stirring was started and a solution of 6.09 g. (0.03 mol) of terephthaloyl chloride in 150 ml. of benzene was added dropwise over a period of 2 minutes. The mixture was filtered and the polymer was washed twice in a Waring Blendor. The polymer was dried in vacuo at 80° C. The inherent viscosity in m-cresol was 0.63. The polymer did not melt below 360° C.

EXAMPLE 25

*Copolyamide of 2,6-dimethylpiperazine: terephthaloyl chloride/isophthaloyl chloride (100:80/20)*

In a Waring Blendor jar there was placed a solution of 3.49 g. (0.03 mol) of 2,6-dimethylpiperazine and 7.44 g. (0.06 mol) of sodium carbonate monohydrate in 150 ml. of water. Stirring was started and 75 ml. of methylene chloride was added. To this stirred emulsion there was added a solution of 4.9 g. (0.024 mol) of terephthaloyl chloride and 1.1 g. (0.006 mol) of isophthaloyl chloride in 50 ml. of methylene chloride. The mixture was stirred for 1½ minutes. The methylene chloride was boiled off on a steam bath. The polymer was washed with water twice in a Waring Blendor and dried in vacuo at 80° C. The yield was 96% and the polymer had an inherent viscosity in m-cresol of 0.76. The polymer did not melt below 360° C.

EXAMPLE 26

*Polyamide from 2,5-dimethylpiperazine and bis-(p-carboxyphenyl)ether*

In a Waring Blendor jar were placed 5.3 g. (0.05 mol) of sodium carbonate, 150 ml. of water, an aqueous solution containing 0.028 mol of 2,5-dimethylpiperazine and 25 ml. of methylene chloride. To this cooled, stirred emulsion was added 7.4 g. (0.025 mol) of bis-(p-chlorocarbonyl phenyl) ether in 25 ml. of methylene chloride. The emulsion was stirred for about 30 minutes, after which the polymer was isolated by evaporation of the methylene chloride on the steam bath. The dried polymer weighed 8.0 g., a yield of 95%, and had an inherent viscosity of 1.5. It did not stick on a heated bar below 350° C. and was soluble in ethylene chlorohydrin, formic acid, chloroform/methanol azeotrope (88/12 by weight) and chloroform/formic acid azeotrope (85/15 by weight) at room temperature.

EXAMPLE 27

*Copolyamide from 2,5-dimethylpiperazine: terephthaloyl chloride/adipyl chloride (100:80/20)*

In a Waring Blendor jar were placed 5.3 g. (0.05 mol) of sodium carbonate, 150 ml. of water, an aqueous solution containing 0.028 mol of 2,5-dimethylpiperazine and 25 ml. of methylene chloride. To this cooled, stirred emulsion was added a mixture of 4.1 g. (0.02 mol) of terephthaloyl chloride and 0.9 g. (0.005 mol) of adipyl chloride in 25 ml. of methylene chloride. The polymer formed readily and was isolated by evaporation of the methylene chloride on the steam bath. It had an inherent viscosity of 0.80. It did not stick on a heated bar below 350° C. and was soluble in ethylene chlorohydrin, formic acid, chloroform/methanol azeotrope (88/12 by weight) and chloroform/formic acid azeotrope (85/15 by weight) at room temperature.

EXAMPLE 28

*Copolyamide from 2,5-dimethylpiperazine/1,3-cyclohexanediamine: terephthaloyl chloride (75/25:100)*

In a Waring Blendor jar were placed 143 ml. of a 10% potassium carbonate-10% potassium bicarbonate buffer solution, 1.3 g. (0.0069 mol) of 1,3-cyclohexanediamine, an aqueous solution containing 0.0206 mol of 2,5-dimethylpiperazine and 25 ml. of methylene chloride. To this cooled, stirred emulsion was added 5.1 g. (0.025 mol) of terephthaloyl chloride in 25 ml. of methylene chloride. The polymer formed readily and was isolated by evaporation of the methylene chloride on the steam bath. The white polymer weighed 5.9 g., a yield of 97%. It had an inherent viscosity of 1.33 and did not stick on a heated bar below 390° C. It was soluble in ethylene chlorohydrin, formic acid, chloroform/methanol azeotrope (88/12 by weight) and chloroform/formic acid azeotrope (85/15 by weight) at room temperature.

EXAMPLE 29

*Copolyamide from 2,5-dimethylpiperazine/1,3-cyclohexanediamine: terephthaloyl chloride (60/40:100)*

In a Waring Blendor jar were placed 0.0165 mol of 2,5-dimethylpiperazine, 1.2 g. (0.011 mol) of 1,3-cyclohexanediamine, 5.3 (0.05 mol) of sodium carbonate, 145 ml. of water and 25 ml. of methylene chloride. To this cooled, stirred emulsion was added 5.1 g. (0.025 mol) of terephthaloyl chloride in 25 ml. of methylene chloride. The polymer formed readily after about five minutes stirring and was obtained in a granular form by evaporation of the methylene chloride. The dry polymer weighed 5.5 g. (89%) and had an inherent viscosity of 0.80. It did not stick on a hot bar below 400° C. It was soluble in m-cresol ethylene chlorohydrin, formic acid and chloroform-formic acid azeotrope.

EXAMPLE 30

*Copoylamide from 2,5-dimethylpiperazine/2,3,5,6-tetramethylpiperazine: terephthaloyl chloride (80/20:100)*

In a Waring Blendor jar were placed 9 ml. (0.022 mol) of an aqueous solution of 2,5-dimethylpiperazine, 0.8 g. (0.005 mol) of 2,3,5,6-tretramethylpiperazine, 5.3 g. (0.05 mol) of sodium carbonate, 115 ml. of water and 10 ml. of methylene chloride. To the cooled, stirred emulsion was added 5.1 g. (0.025 mol) of terephthaloyl chloride in 40 ml. of methylene chloride. The polymer formed readily and was isolated by evaporation of the methylene chloride on the steam bath. The dried, white, granular polymer weighed 6.2 g. (95%). It had an inherent viscosity of 0.76 and did not stick on a heated bar below 395° C. It was soluble in m-cresol, ethylene chlorohydrin, formic acid, and chloroform-formic acid azeotrope.

EXAMPLE 31

*Copolyamide from 2,5-dimethylpiperazine: terephthaloyl chloride/2,2 - bis(p - carboxylphenyl)propane diacid chloride (100:80/20)*

In a Waring Blendor jar was placed 4.0 ml. (0.028 mol) of an aqueous solution of 2,5-dimethylpiperazine, 5.3 g. (0.05 mol) of sodium carbonate, 114 ml. water and 10 ml. methylene chloride. To this cooled, stirred emulsion was added 4.2 g. (0.02 mol) of terephthaloyl chloride and 1.6 g. (0.005 mol) of 2,2-bis(p-carboxyphenyl)propane diacid chloride in 40 ml. of methylene chloride. The polymer formed readily and was isolated by evaporation of the methylene chloride on the steam bath. The white granular polymer thus obtained weighed 6.5 g. (97%) and had an inherent viscosity of 1.29. It did not stick on a heated bar below 395° C. and was soluble in m-cresol, ethylene chlorohydrin, formic acid, chloroform-methanol azeotrope and chloroform-formic acid azeotrope.

EXAMPLE 32

*Copolyamide from 2,5-dimethylpiperazine: terephthaloyl chloride/ethylene bis-chloroformate (100:60/40)*

To a Waring Blendor jar at room temperature was added 4.0 g. (0.10 mol) sodium hydroxide dissolved in 150 cc. water, 20 cc. 5% "Duponol" ME solution, 15 cc. (0.055 mol) aqueous 2,5-dimethylpiperazine solution, and 25 cc. benzene. To the rapidly stirred system was added 6.09 g. (60 mol percent) terephthaloyl chloride and 2.60 cc. (40 mol percent) ethylene bis-chloroformate in 25 cc. methylene chloride. The polymer was isolated, washed and dried. The yield was 10.0 g. and the inherent viscosity in m-cresol was 0.82. The polymer was soluble in such dry-spinning solvents as 15/85 formic acid-chloroform and 12/88 methanol-chloroform. The sticking temperature was above 300° C.

EXAMPLE 33

*Copolyamide from 2,5 - dimethylpiperazine/piperazine: isophthaloyl chloride (55/45:100)*

To a Waring Blendor jar at room temperature was added 10.6 g. (0.1 mol) sodium carbonate dissolved in 150 cc. water, 22.8 cc. (55 mol percent) aqueous 2,5-dimethylpiperazine solution, 20.6 cc. (45 mol percent) aqueous piperazine solution and 25 cc. benzene. To the rapidly stirred system was added 10.6 g. (0.05 mol) of isophthaloyl chloride dissolved in 25 cc. of methylene chloride. The polymer was isolated, washed and dried. The yield was 11 g. and the inherent viscosity in m-cresol was 1.01. The polymer had a sticking temperature above 300° C.

EXAMPLE 34

*Copolymer from 2,5 - dimethylpiperazine/piperazine: terephthaloyl chloride/ethylene bis - chloroformate (55/45:75/25)*

To a Waring Blendor jar at room temperature was added 10.6 g. (0.1 mol) sodium sodium carbonate dissolved in 150 cc. of water, 25 cc. of a 5% solution of "Duponol" ME, 11.8 cc. (55 mol percent) aqueous 2,5-dimethylpiperazine solution, 18.6 cc. (45 mol percent) aqueous piperazine solution and 25 cc. of benzene. To the rapidly stirred system was added 7.61 g. (75 mol percent) terephthaloyl chloride and 1.63 cc. (25 mol percent) ethylene bis-chloroformate dissolved in 25 cc. of benzene. The polymer was isolated, washed and dried. The yield was 9 g., and the inherent viscosity in m-cresol of 0.98. The polymer had a sticking temperature above 300° C. and was soluble in such dry-spinning solvents as 15/85 formic acid-chloroform and 12/88 methanol-chloroform.

EXAMPLE 35

*Polyamide from 2,5 - dimethylpiperazine: 1,4 - dihydroterephthaloyl chloride*

To a stirred solution of 0.033 mol of 2,5-dimethylpiperazine and 0.06 mol of sodium carbonate in 150 ml. of water was added 75 ml. of methylene chloride. The polymerization was run by adding a solution of 6.15 g. (0.03 mol) of 1,4-dihydroterephthaloyl chloride in 50 ml. of methylene chloride to the stirred emulsion. After evaporating the methylene chloride, the white powdery polymer was washed with hot water and dried. The yield was 7.3 g. (99%) and the inherent viscosity in tetrachloroethane-phenol was 2.67. This polyamide was soluble in acetic acid, ethylene chlorohydrin and chloroform-methanol (88/12). A clear, stiff film was cast from the last solvent. The polymer did not melt when heated at 400° C.

EXAMPLE 36

*Polyamide from 2,5 - dimethylpiperazine: 2,3,5,6-tetrachloroterephthaloyl chloride*

Methylene chloride (75 ml.) was emulsified with a solution of 4.1 g. (0.036 mol) of 2,5-dimethylpiperazine and 6.4 g. (0.06 mol) of sodium carbonate in 150 ml. of water. To the stirred emulsion was added a solution of 10.23 g. (0.03 mol) of 2,3,5,6-tetrachloroterephthaloyl chloride in 50 ml. of methylene chloride. The temperature rose from 24° to 29° C. The methylene chloride was distilled off and the white granular polymer was isolated, washed with water and dried. The yield was 11.4 g. (100%). The polyamide did not melt at 400° C. It dissolved in dichloroacetic acid or pentachloroethane-phenol (90.5/9.5). The inherent viscosity in tetrachloroethane-phenol was 0.51.

EXAMPLE 37

*Copolyamide from 2,5-dimethylpiperazine/bis-(4-aminocyclohexyl)methane: terephthaloyl chloride (65/35: 100)*

To an ice-cooled mixture consisting of 0.0325 mol 2,5-dimethylpiperazine, 0.0175 mol liquid bis(4-aminocyclohexyl)methane, 0.1 mol sodium carbonate, 150 ml. methylene chloride and 250 ml. water was added 0.55 mol terephthaloyl chloride in 75 ml. methylene chloride. The polymer, after isolating washing and drying, had an inherent viscosity of 0.70 and did not melt below 390° C. although it softened slightly at 360° C. It was soluble in pentachloroethane-phenol azeotrope.

EXAMPLE 38

*Copolyamide from 2,5-dimethylpiperazine/bis-(4-aminocyclohexyl)methane: terephthaloyl chloride/isophthaloyl chloride (75/25:60/40)*

To an ice-cooled mixture of 0.0375 mol 2,5-dimethylpiperazine, 0.0125 mol solid bis(4-aminocyclohexyl)methane (high in trans-trans), 0.1 mol sodium carbonate, 150 ml. methylene chloride, 240 ml. water was added 0.03 mol terephthaloyl chloride and 0.02 mol isophthaloyl chloride in 75 ml. methylene chloride. The polymer melting point was 390° C., the inherent viscosity was 0.85, and the polymer was soluble in pentachloroethane-phenol (90.5/9.5).

EXAMPLE 39

*Copolyamide from 2,5-dimethylpiperazine/bis(4-aminocyclohexyl)methane: isophthaloyl chloride (75/25:100)*

To an ice-cooled mixture of 0.0375 mol 2,5-dimethylpiperazine, 0.0125 mol solid bis(4-aminocyclohexyl)methane (high in trans-trans), 0.1 mol sodium carbonate, 150 ml. methylene chloride, 240 ml. water was added 0.05 mol isophthaloyl chloride and 75 ml. methylene chloride. The polymer melting point was 340° C. and the inherent viscosity was 0.80. The white powder was soluble in chloroform-methanol azeotrope.

EXAMPLE 40

*Polyamide from 2,3,5,6-tetramethylpiperazine and trans-hexahydroterephthaloyl chloride*

To a stirred, cooled emulsion containing 75 ml. of methylene chloride and 4.7 g. (0.033 mole) of 2,3,5,6-tetramethylpiperazine and 6.4 g. (0.06 mole) of sodium carbonate in 150 ml. of water was added a solution of 6.3 g. (0.03 mole) of trans-hexahydroterephthaloyl chloride in 50 ml. of methylene chloride. The temperature of the polymerization rose from 7 to 11° C. The organic solvent was evaporated and the white polymer which remained was washed with water and dried. The polymer had an inherent viscosity (m-cresol) of 0.45 and did not melt up to 400° C. It was soluble in chloroform-methanol (12/88) and in 1,1,2-trichloroethane.

EXAMPLE 41

*Polyamide from 2,3,5,6-tetramethylpiperazine and terephthaloyl chloride*

An emulsion was prepared from 75 ml. of benzene and 150 ml. of water containing 4.7 g. (0.033 mole) of 2,3,5,6-tetramethylpiperazine and 6.4 g. (0.06 mole) of sodium carbonate. To the stirred emulsion was added a solution of 6.1 g. (0.03 mole) of terephthaloyl chloride in 50 ml. of benzene. The temperature rose from 28 to 34° C. and a curdy material separated. The benzene was evaporated and the polymer was isolated, washed and dried. The product gave an inherent viscosity of 0.36. This polyamide exhibited signs of sticking to a heated bar at 390° C. Solvents for this polymer included methanol-chloroform (12/88) and methylene chloride-methanol (92/8).

EXAMPLE 42

*Copolyamide from 2,3,5,6-tetramethylpiperazine with trans-hexahydroterephthaloyl chloride and terephthaloyl chloride (100/80:20)*

A solution of 4.7 g. of 2,3,5,6-tetramethylpiperazine and 6.4 g. (0.06 mole) of sodium carbonate in 150 ml. of water was emulsified with 75 ml. of methylene chloride. To the stirred, cooled (8° C.) emulsion was added a solution of 5.0 g. (0.024 mole) of trans-hexahydroterephthaloyl chloride and 1.2 g. (0.006 mole) of terephthaloyl chloride in 50 ml. of methylene chloride. The methylene chloride was removed by distillation and white polymer remaining was washed with water and dried. The inherent viscosity in m-cresol was 0.48. The polymer melted above 350° C. and was soluble in methylene chloride-methanol (92/8).

EXAMPLE 43

*Polyamide from 2,3,5-trimethylpiperazine and trans-hexahydroterephthaloyl chloride*

An emulsion was prepared from a solution of 7.0 g. (0.055 mole) of 2,3,5-trimethylpiperazine and 10.6 g. (0.1 mole) of sodium carbonate in 200 ml. of water and 100 ml. of methylene chloride. A solution of 10.45 g. (0.05 mole) of trans-hexahydroterephthaloyl chloride in 75 ml. of methylene chloride was added to the above emulsion. The white powdery polymer which was obtained after evaporating the methylene chloride was washed and dried. The inherent viscosity was 0.52. This polyamide did not melt up to 390° C. and was soluble in chloroform-formic acid (85/15). The 2,3,5-trimethylpiperazine was prepared according to the method described by T. Ravolini and F. Gamborin in Am. Chem. Applicata, volume 39, pages 417–426 (1949) (noted in Chemical Abstracts, volume 46, page 2544) by using propylene-diamine instead of the ethylenediamine reactant mentioned therein.

EXAMPLE 44

*Polyamide from 2,5-diethylpiperazine and terephthaloyl chloride*

An emulsion was prepared from 100 ml. of methylene chloride and a solution of 7.8 g. (0.055 mole) of 2,5-diethylpiperazine and 10.6 g. (0.1 mole) of sodium carbonate in 200 ml. of water. A solution of 10.15 g. (0.05 mole) of terephthaloyl chloride in 100 ml. of methylene chloride was added. The polymer after isolation had an inherent viscosity in m-cresol of 0.95. This polyamide did not melt up to 350° C. and was soluble in trichloroethane-formic acid (58/42). The 2,5-diethylpiperazine was made according to the disclosure in Chemical Abstracts, volume 42, page 3324 (1948).

EXAMPLE 45

*Copolyamide from 2,5-diethylpiperazine and piperazine with terephthaloyl chloride (80:20/100)*

This polymer was prepared as described in the previous example except that a mixture of 5.7 g. (0.04 mole) of 2,5-diethylpiperazine and 0.9 g. (0.01 mole) of piperazine was used in the aqueous phase. The polymer had an inherent viscosity of 0.80 and did not melt up to 350° C. It was soluble in chloroform-formic acid (85/15).

EXAMPLE 46

*Polyamide from 2,2,3,3,5,5,6,6-octamethylpiperazine and terephthaloyl chloride*

An emulsion was prepared from 75 ml. of methylene chloride and 200 ml. of water containing 10.9 g. (0.055 mole) of octamethylpiperazine and 10.6 g. (0.1 mole) of sodium carbonate. A solution of 10.15 g. (0.05 mole) of terephthaloyl chloride in 75 ml. of methylene chloride was added to the above emulsion at room temperature. After evaporating the methylene chloride, washing and drying, the polymer remained as a white powder. This had an inherent viscosity in m-cresol of 0.32. This polyamide did not melt below 300° C. and was soluble in trichloroethane-formic acid (60/40). The 2,2,3,3,5,5, 6,6-octamethylpiperazine was made according to the method disclosed in U. S. Patent No. 2,537,857.

EXAMPLE 47

*Polyamide from piperazine and cis-hexahydroterephthaloyl chloride*

A solution of 4.73 g. (0.055 mole) of piperazine and 10.6 g. (0.1 mole) of sodium carbonate in 250 ml. of water was emulsified with 100 ml. methylene chloride in a Waring Blendor. To the stirred, cooled (8° C.) emulsion was added a solution of 10.45 g. (0.05 mole) of cis-hexahydroterephthaloyl chloride. The reaction mixture became thick and creamy. The methylene chloride was evaporated and the polymer was isolated, washed free of salt and dried. The polyamide had an inherent viscosity of 2.47, was soluble in ethylene chlorohydrin and did not melt at temperatures up to 400° C. Strong fibers were dry spun from ethylene chlorohydrin.

EXAMPLE 48

*Polyamide from piperazine and 1,3-cyclopentane dicarboxylic acid chloride*

To a solution of 4.3 g. (0.05 mole) of piperazine and 10.6 g. (0.1 mole) of sodium carbonate in 250 ml. water was added 50 ml. of cyclohexane. To the stirred, cooled (5° C.) emulsion was added a solution of 0.05 mole of 1,3-cyclopentane dicarboxylic acid chloride in 100 ml. of methylene chloride. The polyamide was isolated, washed free of salts with water and dried. The inherent viscosity in m-cresol was 1.0. The polymer was soluble in chloroform-methanol (88/12) and did not melt below 350° C.

EXAMPLE 49

*Polyamide from piperazine and p,p'-bibenzyldicarboxylic acid chloride*

In a Waring Blendor was placed 12 ml. (0.012 mole) of an aqueous piperazine solution and 88 ml. of 10% potassium bicarbonate-10% potassium carbonate buffer solution. To this was added 3.1 g. (0.01 mole) of p,p'-bibenzyldicarboxylic acid chloride in 100 ml. of methylene chloride. The polymer formed readily and was isolated by evaporation of the methylene chloride. It was filtered, washed free of salt and dried. The yield was 3.0 (94%). The inherent viscosity was 1.14. The polymer was saluble in 2,2,3,3,-tetrafluoropropanol and in chloroform-formic acid at elevated temperatures and did not melt below 350° C.

EXAMPLE 50

*Copolyamide from piperazine: isophthaloyl chloride/terephthaloyl chloride (100:20/80)*

In a Waring Blendor was placed 20 ml. (0.028 mole) of an aqueous piperazine solution, 144 ml. of 10% potassium carbonate-10% potassium bicarbonate buffer solution, and 25 ml. of methylene chloride. To the cooled, stirred emulsion was added 1.02 g. (0.005 mole) of isophthalyl chloride and 4.06 g. (0.02 mole) of terephthaloyl chloride in 50 ml. methylene chloride. The polymer was isolated by evaporation of the methylene chloride, filtered, washed and dried. It weighed 5.1 g. (95% yield), had an inherent viscosity of 0.84 and was soluble in 2,2,3,3-tetrafluoropropanol. This polymer did not melt below 395° C.

EXAMPLE 51

*Copolyamide from piperazine: cis-hexahydroterephthaloyl chloride/terephthaloyl chloride (100:50/50)*

In a Waring Blendor was placed 20 ml. (0.028 mole) of an aqueous piperazine solution, 130 ml. of a 10% potassium carbonate-10% potassium bicarbonate buffer solution and 25 ml. of methylene chloride. To the cooled, stirred emulsion was added 2.6 g. (0.0125 mole) of cis-hexahydroterephthaloyl chloride and 2.5 g. (0.0125 mole) of terephthaloyl chloride in 25 ml. of methylene chloride. The polymer was isolated by evaporation of the methylene chloride, filtered, washed and dried. It had an inherent viscosity of 0.80 and did not melt below 400° C. It was soluble in hot ethylene chlorohydrin and chloroform-formic acid (85/15).

EXAMPLE 52

*Copolyamide from piperazine: isophthaloyl chloride/bibenzoyl chloride (100:50/50)*

In a Waring Blendor were placed 20 ml. (0.028 mole) of an aqueous piperazine solution, 5.3 g. (0.05 mole) of sodium carbonate, 100 ml. water and 25 ml. methylene chloride. To this cooled, stirred emulsion was added 2.5 g. (0.0125 mole) of isophthaloyl chloride and 3.5 g. (0.0125 mole) of bibenzoyl chloride in 25 ml. of methylene chloride. The polymer was isolated by evaporation of the methylene chloride, filtered, washsed and dried. It had an inherent viscosity of 0.92 and did not melt below 300° C. It was soluble in hot ethylene chlorohydrin.

EXAMPLE 53

*Copolyamide from piperazine: terephthaloyl chloride/ 2,2 - bis - (p-carboxylphenyl)propane diacid chloride (100:40/60)*

In a Waring Blendor were placed 20 ml. (0.028 mole) of an aqueous piperazine solution, 5.3 g. (0.05 mole) of sodium carbonate, 100 ml. water and 25 ml. methylene chloride. To the cooled, stirred emulsion was added 4.8 g. (0.015 mole) of 2,2-bis-(p-carboxyphenyl)propane diacid chloride and 2.1 g. (0.010 mole) of terephthaloyl chloride in 25 ml. of methylene chloride. The polymer was isolated by evaporation of the methylene chloride, filtered, washed and dried. It had an inherent viscosity of 1.03 and did not melt below 400° C. It was soluble in ethylene chlorohydrin and chloroform-formic acid (85/15).

EXAMPLE 54

*Copolyamide from piperazine/2,5 - dimethylpiperazine: cis-hexahydroterephthaloyl chloride/trans-hexahydroterephthaloyl chloride (50/50:51/49)*

To an ice cooled mixture of 0.0275 mole of piperazine, 0.0275 mole of 2,5-dimethyl piperazine, 0.1 mole of sodium carbonate, 245 ml. water and 100 ml. methylene chloride was added 0.05 mole of hexahydroterephthaloyl chloride (51 cis/49 trans) in 50 ml. methylene chloride under vigorous stirring. The organic solvent was boiled off and the polymer then washed with three hot water washes. A 97% yield of polymer with an inherent viscosity in m-cresol of 2.11 was obtained.

This copolymer had a polymer melt temperature greater than 392°, density of 1.235, and water absorption (soaked film) of 48%. It was soluble in ethylene chlorohydrin, acetic acid/water (95/5), 1,1,2-trichloroethane/ acetic acid (51/49), and lactonitrile.

EXAMPLE 55

*Copolyamide from piperazine: cis-hexahydroterephthaloyl chloride/trans - hexahydroterephthaloyl chloride (100:51/49)*

In an ice cooled mixture of 2.25 liters of water, 0.6 mole piperazine hexahydrate, 1.1 mole of sodium carbonate, and 1 liter methylene chloride under vigorous stirring was added .5 mole of hexahydroterephthaloyl chloride (51 cis/49 trans) in .5 liter of methylene chloride. The resulting polymer had an inherent viscosity in m-cresol of 1.5. It was spun from acetic acid/formic acid (70/30) dope containing 18% solids. The fiber drawn 3.2× at 300° and boiled off had a tenacity of 2 gpd at 19% elongation. The polymer was soluble in hot chloroform/methanol (88/12), acetic acid/water (95/5), lactonitrile and ethylene chlorohydrin.

EXAMPLE 56

*Polyamide from piperazine and isophthaloyl chloride*

In a Waring Blendor was placed 10.6 g. (0.1 mole) of sodium carbonate, an aqueous solution containing 0.05 mole of piperazine, 160 ml. of water and 150 ml. of methylene chloride. To the stirred emulsion was added 10.2 g. (0.05 mole) of isophthaloyl chloride in 75 ml. of methylene chloride. The polymer formed readily and was obtained in solid form by evaporating the methylene chloride on the steam bath. After drying, the white granular polymer had a melting point of 340° C. and an inherent viscosity of 1.72. The polymer was soluble in hot ethylene chlorohydrin. Strong fibers were dry spun from ethylene chlorohydrin.

EXAMPLE 57

*Copolyamide from piperazine: terephthaloyl chloride/ isophthaloyl chloride (100:50/50)*

In a Waring Blendor was placed 10.6 g. (0.1 mole) of sodium carbonate, an aqueous solution containing 0.06 mole of piperazine, 152 ml. of water and 150 ml. of methylene chloride. To this stirred emulsion was added a mixture of 5.1 g. (0.025 mole) of terephthaloyl chloride and 5.1 g. (0.025 mole) of isophthaloyl chloride in 50 ml. of methylene chloride. The polymer formed in fine granules and was filtered from the aqueous solution after removal of methylene chloride on the steam bath. The somewhat yellow-colored granular polymer had a melting point of 345° C. and an inherent viscosity of 1.42. It was soluble in ethylene chlorohydrin, formic acid, chloroform/methanol azeotrope (88/12) and trichloroethane-acetic acid (51/49) at elevated temperatures.

EXAMPLE 58

*Polyamide from piperazine and 2,2-bis(p-carboxyphenyl)propane diacid chloride*

In a Waring Blendor were placed 140 ml. of a 10% potassium carbonate-10% potassium bicarbonate buffer solution, an aqueous solution containing 0.0137 mole of piperazine and 25 ml. of methylene chloride. The stirred emulsion was colled to 0° and 4.0 g. (0.0125 mole) of 2,2-bis(p-carboxyphenyl)propane diacid chloride in 25 ml. of methylene chloride was added. The emulsion was stirred for about 1 hr. after which the methylene chloride was removed on the steam bath. The light tan polymer was filtered off and washed well. It weighed 4.1 g. (100%) and became sticky at 400° C. The inherent viscosity was 3.25. This polymer was soluble in chloroform, ethylene chlorohydrin, formic acid, chloroform/methanol azeotrope (88/12) and formic acid/chloroform azeotrope (15/85) at elevated temperatures.

EXAMPLE 59

*Copolyamide from piperazine/hexamethylenediamine: cis-hexahydroterephthaloyl chloride (85/15:100)*

In a Waring Blendor was placed an aqueous solution containing 4.0 g. (0.0468 mol) of piperazine, 0.96 g. (0.0083 mol) of hexamethylenediamine and 10.6 g. (0.1 mol) of sodium carbonate in 250 ml. of water along with 100 ml. of methylene chloride. To the stirred, cooled (7° C.) emulsion was added a solution of 10.45 g. (0.05 mol) of cis-hexahydroterephthaloyl chloride in 50 ml. of methylene chloride. After stirring for several minutes, the methylene chloride was evaporated and the polymer was isolated, washed with water and dried. The copolyamide had an inherent viscosity of 1.32, was soluble in ethylene chlorohydrin and did not melt at temperatures up to 400° C. Strong fibers were dry spun from ethylene chlorohydrin.

EXAMPLE 60

*Copolyamide from piperazine: cis-hexahydroterephthaloyl chloride and sebacyl chloride (100:80/20)*

To a cooled emulsion of a solution of 4.73 g. (0.055 mol) of piperazine and 10.6 g. (0.1 mol) of sodium carbonate in 250 ml. of water with 100 ml. of methylene chloride was added with stirring a solution of 8.36 g. (0.04 mol) of cis-hexahydroterephthaloyl chloride and 2.4 g. (0.01 mol) of sebacyl chloride in 50 ml. of methylene chloride. The polymer was isolated, washed with water and dried. The inherent viscosity was 1.81 and the polymer did not melt at temperatures up to 400° C. This polymer was soluble in chloroform-formic azeotrope (85/15). Strong fibers were dry spun from a solution of the polymer in this azeotrope.

EXAMPLE 61

*Copolyamide from piperazine: cis-hexahydroterephthaloyl chloride/2,2-bis(p-carboxyphenyl)propane diacid chloride (100:60/40)*

An emulsion was prepared from a solution of 4.73 g. (0.055 mol) of piperazine and 10.6 g. (0.1 mol) of sodium carbonate in 250 ml. of water and 100 ml. of methylene chloride in a Waring Blendor. To the stirred, cooled (8° C.) emulsion was added a solution of 6.3 g. (0.03 mol) of cis-hexahydroterephthaloyl chloride and 6.4 g. (0.02 mol) of 2,2-bis(p-carboxyphenyl)propane diacid chloride in 100 ml. of methylene chloride. The methylene chloride was evaporated from the thick, creamy product and the polymer was isolated, washed with water and dried. The copolyamide which did not melt at temperatures up to 400° C. had an inherent viscosity of 1.5. This copolyamide was readily dissolved in ethylene chlorohydrin.

EXAMPLE 62

*Copolyamide from piperazine: p,p'-bibenzyldicarboxylic acid chloride/ethylenebischloroformate (100:80/20)*

In a Waring Blendor was placed a solution of a 4.73 g. (0.04 mol) of p,p'-bibenzyldicarboxylic acid chloride sodium carbonate in 250 ml. of water. An emulsion was prepared using 100 ml. of methylene chloride. To the stirred, cooled emulsion was added a solution of 12.3 g. 0.04 mol) of p,p'-bibenzyldicarboxylic acid chloride and 1.9 g. (0.01 mol) of ethylene bischloroformate in 100 ml. of methylene chloride. The polymer formed readily and was isolated by evaporating the methylene chloride. After washing free of salt and drying, the copolyamide obtained had an inherent viscosity of 1.83 and did not melt at temperatures up to 400° C. Chloroform-formic acid (85/15) was a solvent for this copolymer.

EXAMPLE 63

*Copolyamide from piperazine/2,5 - dimethylpiperazine: p,p'-bibenzyldicarboxylic acid chloride/isophthaloyl chloride (50/50:70/30)*

100 ml. of methylene chloride was emulsified in a Waring Blendor with a solution of 2.58 g. (0.03 mols) of piperazine, 3.42 g. (0.03 mol) of 2,5-dimethylpiperazine and 10.6 g. (0.1 mol) of sodium carbonate in 250 ml. of water. A solution of 10.75 g. (0.035 mol) of p,p'-bibenzyldicarboxylic acid chloride and 3.0 g. (0.015 mol) of isophthaloyl chloride in 100 ml. of methylene chloride was added to the cooled, stirred emulsion. The copolyamide was isolated, washed free of salts with water and dried. The inherent viscosity in m-cresol was 1.1. The polymer was soluble in chloroform-formic acid (85/15) and did not melt at temperatures up to 300° C.

EXAMPLE 64

*Copolyamide from piperazine/bis(4-aminocyclohexyl) methane: cis-hexahydroterephthaloyl chloride/sebacyl chloride(80/20:70/30)*

To a solution of 3.44 g. (0.04 mols) of piperazine and 10.6 g. (0.1 mol) of sodium carbonate in 250 ml. of water was added a solution of 2.1 g. (0.01 mol) of bis(4-aminocyclohexyl)methane in 100 ml. of methylene chloride. To the stirred, cooled emulsion was added a solution of 7.3 g. (0.035 mol) of cis-hexahydroterephthaloyl chloride and 3.6 g. (0.015 mol) of sebacyl chloride in 100 ml. of methylene chloride. The methylene chloride was evaporated and the copolyamide was isolated, washed with water and dried. It had an inherent viscosity of 1.2, was soluble in chloroform-formic acid and melted above 300° C.

EXAMPLE 65

*Polyamide from piperazine and terephthaloyl chloride*

In a Waring Blendor at room temperature was placed 1.72 g. piperazine, 1.68 g. sodium hydroxide and 200 cc. water. To the rapidly stirred solution was added a solution of 4.06 g. terephthaloyl chloride in 200 cc. carbon tetrachloride. The product which precipitated immediately was collected, washed and dried. The yield was 96%. Inherent viscosity in m-cresol was 1.25. The polymer was soluble in 2,2,3,3-tetrafluoropropanol. This solution was dry-cast to a film.

EXAMPLE 66

*Polyamide from piperazine and terephthalic acid*

A solution of 20 g. piperazine, 39 g. terephthalic acid, and 200 cc. methanol was refluxed for 24 hours. The mixture was cooled and the 53 g. of product which separated was slurried in 150 cc. water. The water slurry was boiled to extract the piperazine diammonium terephthalate salt from insoluble terephthalic acid. The material was filtered and the filter cake extracted with about 275 cc. boiling water. The water extracts were combined, cooled and alcohol was added to precipitate the salt. The white finely divided product had a melting point of 360° C. (with decomposition). Analysis: Nitrogen, theory—11.0; found—10.9.

A sample of this salt was heated under nitrogen in a closed container for eight hours at 305° C. The product had an inherent viscosity in sulfuric acid of 0.28. It was soluble in 2,2,3,3-tetrafluoropropanol. The polymer was found to be highly crystalline by X-ray diffraction and did not melt up to 400° C.

The polymer may also be prepared from the salt by heating with high boiling phenols such as o-hydroxybiphenyl or p,p'-dihydroxybiphenyl.

EXAMPLE 67

*Filaments prepared directly from piperazine and terephthaloyl chloride*

Sixteen grams of piperazine hexahydrate was dissolved in 100 g. of water together with 1 g. of sodium hydroxide. A solution of 10 g. of terephthaloyl chloride in 200 g. xylene was floated on top of the aqueous solution. Even as the first acid chloride solution was added a polymeric film began to form at the xylene-water interface. This film could be withdrawn continuously from the container in the form of filaments, with new polymer being formed at the interface as rapidly as the old was removed.

EXAMPLE 68

*Polyamide from piperazine and bibenzoyl chloride*

In a Waring Blendor at room temperature was placed 1.72 g. piperazine (0.02 mol), 1.68 g. sodium hydroxide pellets (0.04 mol) and 200 ml. water. Under vigorous agitation a solution containing 5.6 g. bibenzoyl chloride (0.02 mol) in 200 ml. hot benzene was run in to form a polyamide. This addition required two minutes and mixing was continued for 15 minutes. The polyamide precipitated immediately, however. After filtering, the product, in 99% yield, was washed twice with water and then dried at 100° C. in vacuo. The polyamide had an inherent viscosity of 1.38 in sulfuric acid, and did not melt up to 400° C. The polyamide was soluble in 2,2,3,3-tetrafluoropropanol. It was insoluble in formic acid and in the common solvents, chloroform, cyclohexane, cyclohexanone, dimethylformamide, 80% ethanol, water and xylene. A film cast from the fluoroalcohol solution was tough, translucent and had a water absorption at 25° C. of 7.8%. The solution was also dry spun through a multihole spinneret to give a strong yarn.

EXAMPLE 69

*Copolyamide from piperazine/hexamethyldiamine: dibenzoyl chloride (50/50:100)*

By the same procedure as for the example above, a copolymer of piperazine, hexamethylene and bibenzoyl chloride was prepared by substituting an equimolar mixture of the two diamines for the piperazine. The copolymer was obtained in 99% yield, did not melt at 400° C. and had an inherent viscosity in sulfuric acid of 1.3. A film was dry cast from the fluoroalcohol solution and was semi-transparent, flexible and tough. The water absorption at 25° C. was 7.5%.

EXAMPLE 70

*Copolyamide from piperazine: terephthaloyl chloride/ ethylene bischloroformate (100:50/50)*

To a Waring Blendor jar at room temperature was added 10.6 g. (0.10 mol) of sodium carbonate, 130 cc. of water, 41 cc. (0.055 mol) of piperazine solution, 20 cc. of 5% Duponol "ME" solution and 25 cc. of benzene. To the rapidly stirred system was added a mixture of 3.25 cc. (0.025 mol) of ethylene bischloroformate and 5.08 g. (0.025 mol) of terephthaloyl chloride dissolved in 25 cc. of methylene chloride. Acetone was added to break the emulsion, and the polymer was filtered off, washed and dried. The inherent viscosity in m-cresol was 0.98. The polymer melting temperature was above 350° C. It was soluble in such solvents as 1,1,2-trichloroethane/formic acid (60/40), chloroform/formic acid (85/15), formic acid and m-cresol.

EXAMPLE 71

*Copolyamide from piperazine: trans-hexahydroterephthaloyl chloride/ethylene bischloroformate (100:80/20)*

A solution of 275 ml. methylene chloride containing 0.2 mol trans-hexahydroterephthaloyl chloride and 0.05 mol ethylene bischloroformate was added to a vigorously stirred emulsion of 0.3 mol piperazine, 0.55 mol sodium carbonate, 1300 ml. water and 750 ml. methylene chloride, provided with exterior ice cooling. The mixture was stirred 15 min. before filtering. The polymer was isolated, washed with hot water and dried. The polymer melt temperature was above 400° C. It was soluble in formic acid, 2,2,3,3-tetrafluoropropanol, and 1,1,2-trichloroethane/formic acid (85/15). The inherent viscosity in tetrachloroethane/phenol (60/40) was 1.27.

EXAMPLE 72

*Polyamide from piperazine and trans-hexahydroterephthaloyl chloride*

To a cooled (7° C.) emulsion of 60 ml. of methylene chloride and 150 ml. of water containing 2.85 g. (0.033 mol) of piperazine and 6.4 g. (0.06 mol) of sodium carbonate was added a solution of 6.3 g. (0.03 mol) of trans-hexahydroterephthaloyl chloride in 30 ml. of methylene chloride. The thick emulsion which resulted was broken by evaporating the methylene chloride. The polymer was isolated, washed well with water and dried. A 90% yield of polyamide with an inherent viscosity of 1.1 in tetrachloroethane/phenol (60/40) was obtained. This polymer did not melt at temperatures up to 400° C. It was soluble in trichloroethane/formic acid (58/42) and 2,2, 3,3-tetrafluoropropanol.

EXAMPLE 73

*Polyamide from methylpiperazine and terephthaloyl chloride*

In a Waring Blendor there was placed a solution of 3.6 g. (0.036 mol) of methylpiperazine and 6.4 g. (0.06 mol) of sodium carbonate dissolved in 150 ml. of water. Methylene chloride, 75 ml., was added; stirring was started and to this stirred emulsion was added a solution of 6.1 g. (0.03 mol) of terephthaloyl chloride dissolved in 50 ml. of methylene chloride. The mixture was evaporated on a steam bath. The polymer was washed twice with water and dried in vacuo at 80° C. The polymer had an inherent viscosity in m-cresol of 0.59. The polymer did not melt below 400° C., and it was soluble in chloroethanol, chloroethanol/water (60/40), acetic acid/water (95/5), formic acid.

EXAMPLE 74

*Copolymer from methylpiperazine: terephaloyl chloride/ ethylene bischloroformate (100:80/20)*

In a Waring Blendor there was placed a solution of 3.6 g. (0.036 mol) of methylpiperazine and 6.4 g. (0.06 mol) of sodium carbonate in 150 ml. of water. The aqueous solution was emulsified with 50 ml. of methylene chloride, and to this stirred emulsion there was added a solution of 4.9 g. (0.024 mol) of terephthaloyl chloride and 1.1 g. (0.006 mol) of ethylene bischloroformate in 50 ml. of methylene chloride. The mixture was stirred for 5 minutes and then the methylene chloride was evaporated on a steam bath. The polymer was washed twice with water and dried in vacuo at 70° C. The polymer had an inherent viscosity in m-cresol of 0.45. The polymer did not melt below 400° C. and it was soluble in the following solvents: acetic acid/water (95/5), formic acid, methanol/chloroform (12/88), formic acid/chloroform (15/85), ethylene chlorohydrin and ethylene chlorohydrin/water (60/40). Strong fibers were dry-spun from methanol/chloroform azeotrope.

EXAMPLE 75

*Polyamide from methylpiperazine and bibenzoyl chloride*

In a Waring Blendor there was placed a solution of 2.2 g. (0.022 mol) of methylpiperazine and 4.24 g. (0.04 mol) of sodium carbonate in 100 ml. of water. The aqueous solution was emulsified with 25 ml. of methylene chloride and to this emulsion there was added a hot slurry of 5.6 g. (0.02 mol) of bibenzoyl chloride in 50 ml. of methylene chloride. The mixture was stirred for 5 minutes and then the methylene chloride was evaporated on a steam bath. The polymer was washed twice with water and dried in vacuo at 70° C. The yield of polymer was 5.8 g. (95%) and it had an inherent viscosity in m-cresol of 0.89. The polymer stuck to a heated bar at 325° C. and it was soluble in the following solvents: acetic acid/water (95/5), formic acid, methanol/chloroform (12/88), formic acid/chloroform (15/85), chloroform, methylene chloride, chloroethanol and chloroethanol/water (60/40). Strong fibers were dry-spun from formic acid/chloroform azeotrope.

EXAMPLE 76

*Copolymer from methylpiperazine: terephthaloyl chloride/isophthaloyl chloride (100:80/20)*

In a Waring Blendor there was placed a solution of 3.6 g. (0.036 mol) of methylpiperazine and 6.4 g. (0.06 mol) of sodium carbonate in 150 ml. of water. The aqueous solution was emulsified with 75 ml. of methylene chloride and to this stirred emulsion there was added a solution of 4.9 g. (0.024 mol) of terephthaloyl chloride and 1.2 g. (0.006 mol) of isophthaloyl chloride in 50 ml. of methylene chloride. The mixture was stirred for 5 minutes and then the methylene chloride was evaporated on a steam bath. The polymer was washed twice with water and dried in vacuo at 70° C. The polymer had an inherent viscosity in m-cresol of 0.49. The polymer did not melt below 400° C., and it was soluble in the following solvents: acetic acid, acetic acid/water (95/5), formic acid, methanol/chloroform (12/88), formic acid/chloroform (15/85), chloroform, chloroethanol and chloroethanol/water (60/40).

EXAMPLE 77

*Polyamide from methylpiperazine and trans-hexahydroterephthaloyl chloride*

In an ice-jacketed Waring Blendor there was placed a solution of 2.0 g. (0.02 mol) of methylpiperazine and 3.9 g. (0.037 mol) of sodium carbonate in 100 ml. of water. The aqueous solution was emulsified with 38 ml. of methylene chloride and to it there was added a solution of 3.85 g. (0.0184 mol) of trans-hexahydroterephthaloyl chloride in 38 ml. of methylene chloride. The mixture was stirred for 4 minutes, and then the methylene chloride was evaporated on a steam bath. The polymer was washed twice with water and dried in vacuo at 70° C. The polymer had an inherent viscosity in m-cresol of 0.94. The polymer did not melt below 400° C., and it was soluble in formic acid and formic acid/chloroform (15/85).

EXAMPLE 78

*Copolyamide from methylpiperazine: terephthaloyl chloride/adipyl chloride (100:80/20)*

In a Waring Blendor there was placed an ice cold solution of 3.3 g. (0.033 mol) of methylpiperazine and 6.4 g. (0.06 mol) of sodium carbonate in 150 ml. of water. The aqueous solution was emulsified with 50 ml. of methylene chloride, and to it there was added a solution of 4.9 g. (0.024 mol) of terephthaloyl chloride and 1.1 g. (0.006 mol) of adipyl chloride in 50 ml. of methylene chloride. The mixture was stirred for 5 minutes, and then the methylene chloride was evaporated on a steam bath. The polymer was washed twice with water and dried in vacuo at 70° C. The polymer had an inherent viscosity in m-cresol of 0.94. The polymer did not melt below 400° C., and it was soluble in the following solvents: acetic acid/water (95/5), methanol/chloroform (12/88), formic acid/chloroform (15/85), chloroethanol, and chloroethanol/water (60/40).

EXAMPLE 79

*Copolyamide from methylpiperazine/b i s(4-amino-3-methylcyclohexyl)methane: terephthaloyl chloride (75/25:100)*

In a Waring Blendor there was placed a solution of 2.25 g. (0.0225 mol) of methylpiperazine and 6.4 g. (0.06 mol) of sodium carbonate in 150 ml. of water. The aqueous solution was emulsified with a solution of 1.8 g. (0.0075 mol) of bis(4-amino-3-methylcyclohexyl)methane in 50 ml. of methylene chloride. To the stirred emulsion there was added drop-wise over 1 minute a solution of 6.1 g. (0.03 mol) of terephthaloyl chloride in 50 ml. of methylene chloride. The reaction mixture was stirred for 5 minutes, and then the methylene chloride was evaporated on a steam bath. The polymer was washed twice and dried in vacuo at 70° C. The yield of polymer was 7.9 g. (100%) and it had an inherent viscosity in m-cresol of 0.90. The polymer stuck to a heated bar at 355° C., and it was soluble in acetic acid/water (95/5), hot formic acid/chloroform (15/85), methanol/chloroform (12/88), ethylene chlorohydrin and formic acid. Strong fibers were dry-spun from ethylene chlorohydrin.

EXAMPLE 80

*Copolyamide from methylpiperazine/2,5-dimethylpiperazine: terephthaloyl chloride (60/40:100)*

In a Waring Blendor there was placed a solution of 1.8 g. (0.018 mol) of methylpiperazine, 1.4 g. (0.012 mol) of 2,5-dimethylpiperazine and 6.4 g. (0.06 mol) of sodium carbonate in 150 ml. of water. The aqueous solution was emulsified with 75 ml. of methylene chloride and to the stirred emulsion there was added a solution of 6.1 g. (0.03 mol) of terephthaloyl chloride in 50 ml. of methylene chloride. The mixture was stirred for 5 minutes and the methylene chloride was evaporated on a steam bath. The polymer was washed twice with water and dried in vacuo at 70° C. The yield of polymer was 6.4 g. (90%) and it had an inherent viscosity in m-cresol of 0.90. The polymer did not melt below 400° C., and it was soluble in acetic acid/water (95/5), formic acid/chloroform (15/85), methanol/chloroform (12/88), ethylene chlorohydrin and ethylene chlorohydrin/water. The polymer was dry-spun into strong fibers from ethylene chlorohydrin.

EXAMPLE 81

*Copolyamide from methylpiperazine/bis(4-aminocyclohexyl)methane: terephthaloyl chloride (60/40:100)*

In a Waring Blendor there was placed a solution of 1.8 g. (0.018 mol) of methylpiperazine and 6.4 g. (0.06 mol) of sodium carbonate in 150 ml. of water. The aqueous solution was emulsified with a solution of 2.46 g. (0.012 mol) of bis(4-aminocyclohexyl)methane in 50 ml. of methylene chloride. To the stirred emulsion there was added drop-wise over a period of 50 seconds a solution of 6.1 g. (0.03 mol) of terephthaloyl chloride in 50 ml. of methylene chloride. The reaction mixture was stirred for 4 minutes and then the methylene chloride was evaporated on a steam bath. The polymer was washed twice with water and dried in vacuo at 70° C. The polymer had an inherent viscosity of 0.86 in m-cresol. The polymer stuck to a heated bar at 365° C. and it was soluble in the following solvents: formic acid/chloroform (15/85), methanol/chloroform (12/88), ethylene chlorohydrin and formic acid.

EXAMPLE 82

*Copolyamide from methylpiperazine/3-methoxyhexamethylenediamine: terephthaloyl chloride (90/10:100)*

In a Waring Blendor there was placed a solution of 2.7 g. (0.027 mol) of methylpiperazine, 0.44 g. (0.003 mol) of 3-methoxyhexamethylenediamine and 6.4 g. (0.06 mol) of sodium carbonate in 150 ml. of water. The aqueous solution was emulsified with 50 ml. of methylene chloride and to this stirred emulsion there was added a solution of 6.1 g. (0.03 mol) of terephthaloyl chloride in 50 ml. of methylene chloride. The mixture was stirred for 5 minutes and then the methylene chloride was evaporated on a steam bath. The polymer was washed twice with water and dried in vacuo at 70° C. The yield was 6.4 g. (91%) and the polymer had an inherent viscosity in m-cresol of 0.70. The polymer did not melt below 400° C. and it was soluble in acetic acid/water (95/5), formic acid/chloroform (15/85), methanol/chloroform (12/88), ethylene chlorohydrin, ethylene chlorohydrin/water (60/40) and formic acid. Methanol/chloroform azeotrope was used as the solvent in dry-spinning fibers.

EXAMPLE 83

*Copolyamide from methylpiperazine/1,3-cyclohexanediamine: terephthaloyl chloride (75/25:100)*

In a Waring Blendor there was placed a solution of 2.25 g. (0.0225 mol) of methylpiperazine, 0.86 g. (0.0075 mol) of 1,3-cyclohexanediamine and 6.4 g. (0.06 mol) of sodium carbonate in 150 ml. of water. The aqueous solution was emulsified with 50 ml. of methylene chloride, and to this stirred emulsion there was added a solution of 6.1 g. (0.03 mol) of terephthaloyl chloride in 50 ml. of methylene chloride. The mixture was stirred for 5 minutes and the methylene chloride was evaporated on a steam bath. The polymer was washed twice with water and dried in vacuo at 70° C. The yield of polymer was 6.9 g. (100%) and it had an inherent viscosity in m-cresol of 0.43. The polymer stuck to a heated bar at 345° C., and it was soluble in acetic acid/water (95/5), formic acid/chloroform (15/85) methanol/chloroform (12/88), chloroethanol, chloroethanol/water (60/40), and formic acid.

EXAMPLE 84

*Copolyamide from methylpiperazine: terephthaloyl chloride/hexahydroterephthaloyl chloride (100:80/20)*

In a Waring Blendor there was placed a solution of 3.6 g. (0.036 mol) of methylpiperazine and 6.4 g. (0.06 mol) of sodium carbonate in 150 ml. of water. The aqueous solution was emulsified with 50 ml. of methylene chloride, and to this stirred emulsion there was added a solution of 4.9 g. (0.024 mol) of terphthaloyl chloride and 1.25 gr. (0.006 mol) of hexahydroterephthaloyl chloride in 50 ml. of methylene chloride. The mixture was stirred for 5 minutes, and then the methylene chloride was evaporated on a steam bath. The polymer was washed twice with water and dried in vacuo at 70° C. The polymer had an inherent viscosity in m-cresol of 0.48. The polymer did not melt below 400° C., and was soluble in the following solvents: acetic acid/water (95/5), formic acid, methanol/chloroform (12/88), formic acid/chloroform (15/85), ethylene chlorohydrin and ethylene chlorohydrin/water (60/40). Strong fibers were dry-spun from ethylene chlorohydrin.

EXAMPLE 85

*Polyamide from methylpiperazine and hexahydroterephthaloyl chloride*

In an ice jacketed Waring Blendor there was placed an ice-cold solution of 3.4 g. (0.034 mol) of methyl piperazine and 6.4 g. (0.06 mol) of sodium carbonate in 150 ml. of water. The aqueous solution was emulsified with 50 ml. of ice-cold methylene chloride and to this stirred emulsion there was added an ice-cold solution of 6.25 g. (0.03 mol) of hexahydroterephthaloyl chloride in 50 ml. of methylene chloride. The mixture was stirred for 5 minutes, and then the methylene chloride was evaporated on a steam bath. The polymer was washed twice with water and dried in vacuo at 70° C. The polymer had an inherent viscosity in m-cresol of 0.49. The polymer did not melt below 400° C., and it was soluble in acetic acid, acetic acid/water (95/5), formic acid, methanol/chloroform (12/88), formic acid/chloroform (15/85), ethylene chlorohydrin and ethylene chlorohydrin/water (60/40).

EXAMPLE 86

*Polyamide from 2-phenylpiperazine and terephthaloyl chloride*

In a Waring Blendor was placed a solution of 5.83 g. (0.036 mol) of 2-phenylpiperazine and 6.4 g. (0.06 mol) of sodium carbonate dissolved in 150 ml. of water. Benzene, 75 ml., was added; stirring was started and to this stirred emulsion was added a solution of 6.1 g. (0.04 mol) of terephthaloyl chloride dissolved in 50 ml. of benzene. The reaction mixture was stirred for 5 minutes and then the benzene was evaporated on a steam bath. The polymer after washing twice with boiling water and drying in vacuo at 70° C. had a stick temperature of 305° C. and an inherent viscosity of 0.26. It was soluble in methylene chloride.

EXAMPLE 87

*Polyamide from decahydroquinoxaline and terephthaloyl chloride*

A solution of 7 parts of decahydroquinoxaline and 11 parts of sodium carbonate in 400 parts of water was placed in a Waring Blendor. A solution of 10 parts of terephthaloyl chloride in 100 parts of methylene chloride was added to the blendor under conditions of high agitation of the aqueous solution. The emulsion was stirred for 5 minutes, the polymer coagulated in acetone, washed well to remove occluded salt and dried. A yield of 12 parts (93%) of white polymer with an inherent viscosity of 2.7 measured at 0.5% concentration in m-cresol was obtained. This polymer is useful in the preparation of films, fibers and molded articles.

The decahydroquinoxaline used in this example may be prepared as follows:

A solution of 350 parts of quinoxaline in 350 parts of dioxane is mixed with 10 parts of ruthenium oxide catalyst and placed in an autoclave. The autoclave is pressured to 2500 p.s.i. with hydrogen and heated to 125° C. Hydrogenation proceeds smoothly and is complete (5 moles of hydrogen uptake per mole of quinoxaline) in 5 hours. The catalyst is removed by filtration and after removal of solvent the diamine (340 parts) (90%) is distilled under reduced pressure.

EXAMPLE 88

*Copolyamide from piperazine: isophthaloyl chloride/sebacyl chloride (100:50/50)*

In a Waring Blendor was placed a solution of 3.885 g. (0.02 mol) of piperazine hexahydrate and 1.600 g. (0.04 mol) of sodium hydroxide in 100 cc. of water. To the rapidly stirred solution was quickly added a solution of 2.030 g. (0.01 mol) of isophthaloyl chloride and 2.391 g. (0.01 mol) of sebacyl chloride in 100 cc. of methylene chloride. The resulting emulsion was stirred for three minutes. The polymer precipitate was obtained by adding water and stirring for one minute. The polymer was filtered, washed several times with water, and dried in a vacuum oven at 80° C. The yield was 94% and the inherent viscosity in m-cresol was 1.23. The polymer melt temperature was 300° C.

This high melt temperature was surprising in view of the fact that Flory et al., Journal of American Chemical Society, volume 73, page 2537 (1951) records the following melting temperatures for piperazine: sebacoyl chloride/isophthaloyl chloride copolymers in which the mol fraction of sebacoyl piperazine units varied from 1.0 to 0.7:

| Mol Fraction of Sebacoyl Piperazine Units in Polymer | Melting Temperature, ° C. |
|---|---|
| 1.0 | 185 |
| 0.9 | 174 |
| 0.8 | 163 |
| 0.7 | 152 |

These results of Flory et al., showing that each addition of 0.1 mol fraction of isophthaloyl piperazine units lowered the melting point of the copolymer by 11° C., would indicate that only low melting copolymers could be obtained.

The preceding examples have illustrated the use of a wide variety of piperazines in preparing the products of this invention. Additional examples of piperazines which are suitable for use in the same manner to form similar products within the scope of this invention include 2,3,5-tri-n-butylpiperazine, decylpiperazine, 2,3,5,6-tetraphenylpiperazine, 2,3,5,6 - tetratolylpiperazine, 2,2,5,5 - tetramethylpiperazine, 2,5 - dinaphthylpiperazine, 2,5 - ditolylpiperazine, 2,2,3,5,5,6-hexamethylpiperazine, 2,2,3,5,5,6-hexaethylpiperazine, tetrahydroquinoxaline, 2,5-diethynyl-piperazine, 1,2,3,5,9,10,11,12-octahydrophenazine, perhydrophenazine, naphthylpiperazine, tolylpiperazine, phenylethylpiperazine, phenylmethylpiperazine, propylpiperazine, ethylpiperazine, butylpiperazine, pentylpiperazine, 2,5-diphenylpiperazine, 2,6-dipropylpiperazine, 2,5-di-n-butylpiperazine, 2,5-di-t-butylpiperazine, 2,3,5-triethylpiperazine, 2,3,5-tripropylpiperazine, 2,3,5,6-tetraethylpiperazine, 2,3,5,6-tetra-n-propylpiperazine, and 2,5-divinylpiperazine.

The light durability of the polymers of this invention as well as other synthetic linear condensation polymers is improved by incorporating therein manganous salts e.g., manganous lactate, cupric salts, e.g., cupric acetate or substituted benzophenones e.g., 2,2'-dihydroxy-4,4'-dimethoxybenzophenone.

The examples show some of the valuable properties of a new class of polymers in which the recurring structural unit, or the dominant structural unit in the case of the copolymers, is represented by the general formula

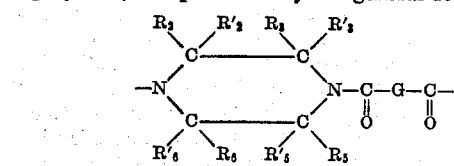

wherein the R and R' symbols represent hydrogen, alkyl and aryl substituents at the 2, 3, 5, and 6 positions on carbon of the piperazine nucleus, wherein the carbon atoms in each separate substituent do not exceed $$\frac{10n}{(n-1)^2+1}$$

counting a directly attached aromatic ring as 3 carbons, $n$ being the number of substituents, and wherein G is a carbocyclic group, each

group being attached to a carbocyclic ring and separated from another

group by at least three atoms. The outstanding advantages of these polymers are that they remain solid at temperatures up to at least 300° C., dissolve in suitable solvents to form solutions from which fibers or films can be readily formed by dry-spinning or film-casting techniques and are easily synthesized by the methods described to a suitable quality and high molecular weight for forming useful fibers and films. A subgenus of the class has been defined, the members of which are substantially infusible and are, therefore, exceptionally valuable for textile uses because of the freedom from ironing difficulties. They are also valuable for uses requiring high temperature resistance such as insulation, coatings, tire cord, heat stable filters and the like. The members of the other subgenus of the class, which soften at high temperatures, have advantages over the commercial polyamides because of the higher melting point and over infusible polymers when a material which can be molded or otherwise shaped with heat is desired.

These polymers are not only adapted and useful for dry-spinning and dry-casting techniques but are generally suitable for all kinds of solution-spinning and casting. Thus, wet-spinning and casting can be employed if desired.

The solutions of the polymers have further utility in that they are useful in the concentration range of 5 to 50% for making a wide variety of articles by means of dipping, extruding, calendering, casting or other molding techniques, useful as lacquers in the concentration range of 1 to 20%, useful as coating compositions in the concentration range of 5 to 50%, and useful as sizing or fabric treating agents in the concentration range of 1 to 20%.

Since many different embodiments of the invention may be made without departing from the spirit and scope thereof, it is to be understood that the invention is not limited by the specific illustrations except to the extent defined in the following claims.

What is claimed is:

1. A fiber-forming, synthetic, linear condensation polymer capable of orientation along the fiber axis wherein the units making up the polymer consist essentially of a polycarbonamide of (a) at least one piperazine in which at least one hydrogen on carbon of the piperazine nucleus is replaced by a hydrocarbon radical, the said hydrocarbon radical containing up to $$\frac{10n}{(n-1)^2+1}$$

carbons, where $n$ is the total number of such substituents and any aromatic ring attached directly to a singly substituted carbon of the piperazine nucleus is counted as 3 carbons, there being no more than 1 aromatic ring attached to any carbon of the piperazine nucleus and (b) at least one carbocyclic dicarboxylic acid in which each carboxyl group is attached to a carbocyclic ring and the carboxyl groups are separated by at least three atoms, the said polymer remaining solid at a high temperature and being capable of being dissolved to form a solution suitable for spinning.

2. The polymer of claim 1 wherein the said hydrocarbon radical is alkyl.

3. The polymer of claim 1 wherein the carboxyl groups of the said carbocyclic dicarboxylic acid are located at the structural extremities of the carbocyclic nucleus.

4. The polymer of claim 3 wherein the said hydrocarbon radical is alkyl.

5. The polymer of claim 4 wherein the said alkyl group is methyl.

6. The polymer of claim 2 wherein a hydrogen attached to carbon in each of the 2- and 5-positions of the piperazine nucleus is substituted by methyl.

7. The polymer of claim 6 wherein the carbocyclic dicarboxylic acid is terephthalic acid.

8. The polymer of claim 6 wherein the carbocyclic dicarboxylic acid is dibenzoic acid.

9. The polymer of claim 6 wherein the carbocyclic dicarboxylic acid is hexahydroterephthalic acid.

10. The polymer of claim 2 wherein only one hydrogen attached to carbon of the piperazine nucleus is substituted by methyl.

11. The polymer of claim 10 wherein the said carbocyclic dicarboxylic acid is terephthalic acid.

12. The polymer of claim 10 wherein the said carbocyclic dicarboxylic acid is isophthalic acid.

13. A fiber of the polymer of claim 1.

14. A film of the polymer of claim 1.

15. A fiber-forming synthetic, linear condensation polymer capable or orientation along the fiber axis wherein at least about 50 mol percent of the units making up the polymer are units of a polycarbonamide of (a) at least one piperazine in which at least one hydrogen on carbon of the piperazine nucleus is replaced by a hydrocarbon radical, the said hydrocarbon radical containing up to $$\frac{10n}{(n-1)^2+1}$$

carbons, wherein $n$ is the total number of such substituents and any aromatic ring attached directly to a single substituted carbon of the piperazine nucleus is counted as 3 carbons, there being no more than 1 aromatic ring attached to any carbon of the piperazine nucleus and (b) at least one carboxylic dicarboxylic acid in which each carboxyl group is attached to a carbocyclic ring and the carboxyl groups are separated by at least three atoms, any remaining units being joined within the polymer chain by a linkage of the group consisting of carbonamide, sulfonamide, ureylene, urethane, carboxylic phenylene ester and sulfonic phenylene ester, the limit of different structural units in any copolymer being about 6, the said polymer remaining solid at a high temperature and being capable of being dissolved to form a solution suitable for spinning.

16. The polymer of claim 15 wherein the carboxyl groups of the said carbocyclic dicarboxylic acid are located at the structural extremities of the carboxylic nucleus.

17. The polymer of claim 16 wherein the said hydrocarbon radical is alkyl.

18. The polymer of claim 17 wherein the said alkyl radical is methyl.

19. A fiber of the polymer of claim 15.

20. A film of the polymer of claim 15.

References Cited in the file of this patent

UNITED STATES PATENTS

| | | |
|---|---|---|
| 2,130,948 | Carothers | Sept. 20, 1938 |
| 2,252,554 | Carothers | Apr. 12, 1941 |
| 2,274,831 | Hill | Mar. 3, 1942 |
| 2,279,752 | Jacobson | Apr. 14, 1942 |
| 2,400,022 | Pollard et al. | May 7, 1946 |
| 2,516,289 | Barrick et al. | July 25, 1950 |
| 2,625,536 | Kirby | Jan. 13, 1953 |
| 2,708,617 | Magat et al. | May 17, 1955 |
| 2,831,834 | Magat | Apr. 22, 1958 |

FOREIGN PATENTS

| | | |
|---|---|---|
| 614,625 | Great Britain | Dec. 20, 1948 |
| 831,326 | Germany | Feb. 14, 1952 |
| 529,414 | Belgium | June 30, 1954 |

OTHER REFERENCES

Bain et al.: J. Am. Chem. Soc. 61, 532 (1939).

Lieser et al.: Liebig's Annalen Der Chemie, vol. 548 (1941), pages 226–254. (Copy in Sci. Libr.)

Lieser et al.: Ibid, 556, 1944, pages 114–126. (Copy in Scientific Library.)

J. Polymer Sci. 8, 257–61 (1952).

Hill: "Fibers From Synthetic Polymers" (Elsevier, 1953), page 136.

Flory et al.: J. Am. Chem. Soc., vol. 73 (1951), pages 2532–2538. (Copy in Scientific Library.)

UNITED STATES PATENT OFFICE
CERTIFICATE OF CORRECTION

Patent No. 2,913,433                                                                                November 17, 1959

Emerson L. Wittbecker

It is hereby certified that error appears in the printed specification of the above numbered patent requiring correction and that the said Letters Patent should read as corrected below.

Column 4, line 5, for "doe" read -- does --; column 19, line 48, for "carboxylphenyl", in italics, read -- carboxyphenyl --, in italics; column 20, line 29, strike out "sodium", second occurrence; column 22, line 64, for "0.80" read -- 0.84 --; column 23, line 54, for "3.0 (94%)" read -- 3.0 g. (94%) --; lines 55 and 56, for "saluble" read -- soluble --; column 24, line 28, for "washsed" read -- washed --; column 25, line 52, for "colled" read -- cooled --; column 26, line 47, for "g. (0.04 mol) of p,p'-bibenzyldicarboxylic acid chloride" read -- g. (0.055 mol) of a piperazine and 10.6 g. (0.1 mol) of --; column 28, line 8, for "sulfurc" read -- sulfuric --; column 36, line 12, for "carboxylic" read -- carbocyclic --; line 25, for "carboxylic" read -- carbocyclic --.

Signed and sealed this 7th day of June 1960.

(SEAL)
Attest:
KARL H. AXLINE                                              ROBERT C. WATSON
Attesting Officer                                     Commissioner of Patents